(12) United States Patent
Bocklet et al.

(10) Patent No.: US 10,650,807 B2
(45) Date of Patent: May 12, 2020

(54) METHOD AND SYSTEM OF NEURAL NETWORK KEYPHRASE DETECTION

(71) Applicant: Intel Corporation, Santa Clara, CA (US)

(72) Inventors: Tobias Bocklet, Munich (DE); Jacek Ossowski, Gdansk (PL); Tomasz Dorau, Gdansk (PL); Maciej Muchlinski, Gdansk (PL); David Pearce, El Dorado Hills, CA (US); Piotr Rozen, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 56 days.

(21) Appl. No.: 16/134,826

(22) Filed: Sep. 18, 2018

(65) Prior Publication Data

US 2019/0043488 A1 Feb. 7, 2019

(51) Int. Cl.

| | | |
|---|---|---|
| *G10L 15/00* | (2013.01) | |
| *G10L 15/16* | (2006.01) | |
| *G10L 15/22* | (2006.01) | |
| *G06N 7/00* | (2006.01) | |
| *G06N 3/063* | (2006.01) | |
| *G10L 15/02* | (2006.01) | |
| *G06N 3/04* | (2006.01) | |
| *G10L 15/08* | (2006.01) | |
| *G10L 25/84* | (2013.01) | |
| *G10L 25/30* | (2013.01) | |

(52) U.S. Cl.
CPC .............. *G10L 15/16* (2013.01); *G06N 3/063* (2013.01); *G06N 7/005* (2013.01); *G10L 15/22* (2013.01); *G06N 3/0445* (2013.01); *G10L 15/02* (2013.01); *G10L 25/30* (2013.01); *G10L 25/84* (2013.01); *G10L 2015/088* (2013.01); *G10L 2015/223* (2013.01)

(58) Field of Classification Search
CPC combination set(s) only.
See application file for complete search history.

(56) References Cited

U.S. PATENT DOCUMENTS

| | | | |
|---|---|---|---|
| 5,384,893 A | 1/1995 | Hutchins | |
| 6,138,095 A | 10/2000 | Gupta et al. | |
| 6,205,424 B1 | 3/2001 | Goldenthal et al. | |
| 6,480,827 B1 | 11/2002 | McDonald | |
| 7,139,714 B2 | 11/2006 | Bennett et al. | |
| 7,457,748 B2 | 11/2008 | Nefti et al. | |
| 7,487,091 B2 | 2/2009 | Miyazaki | |
| 7,603,278 B2 | 10/2009 | Fukada et al. | |
| 7,720,683 B1 | 5/2010 | Vermeulen et al. | |

(Continued)

FOREIGN PATENT DOCUMENTS

WO 2017091270 6/2017

OTHER PUBLICATIONS

Notice of Allowance for U.S. Appl. No. 15/390,384, dated Jun. 8, 2018.

(Continued)

*Primary Examiner* — Vu B Hang
(74) *Attorney, Agent, or Firm* — Green, Howard & Mughal LLP.

(57) ABSTRACT

A method and system are directed to autonomous neural network keyphrase detection and includes generating and using a multiple element state score vector by using neural network operations and without substantial use of a digital signal processor (DSP) to perform the keyphrase detection.

25 Claims, 16 Drawing Sheets

(56) References Cited

U.S. PATENT DOCUMENTS

| | | |
|---|---|---|
| 8,255,215 B2 | 8/2012 | Li et al. |
| 8,527,271 B2 | 9/2013 | Wandinger et al. |
| 8,818,802 B2 | 8/2014 | Fastow et al. |
| 9,070,367 B1 | 6/2015 | Hoffmeister |
| 9,299,338 B2 | 3/2016 | Kato |
| 9,368,105 B1 | 6/2016 | Freed et al. |
| 9,401,140 B1 | 7/2016 | Weber et al. |
| 9,484,030 B1 | 11/2016 | Meaney et al. |
| 9,646,613 B2 | 5/2017 | Blouet |
| 9,792,097 B2 | 10/2017 | Glendenning et al. |
| 9,792,907 B2 | 10/2017 | Bocklet et al. |
| 2002/0062212 A1 | 5/2002 | Nakatsuka |
| 2002/0087314 A1 | 7/2002 | Fischer et al. |
| 2007/0285505 A1 | 12/2007 | Korneliussen |
| 2008/0281599 A1 | 11/2008 | Rocca |
| 2010/0198598 A1 | 8/2010 | Herbig et al. |
| 2010/0324900 A1 | 12/2010 | Faifkov et al. |
| 2012/0166194 A1 | 6/2012 | Jung et al. |
| 2012/0173234 A1 | 7/2012 | Fujimoto et al. |
| 2012/0245934 A1 | 9/2012 | Talwar et al. |
| 2013/0289994 A1 | 10/2013 | Newman et al. |
| 2014/0025379 A1 | 1/2014 | Ganapathiraju et al. |
| 2014/0058731 A1 | 2/2014 | Tyagi et al. |
| 2014/0079297 A1 | 3/2014 | Tadayon |
| 2014/0129224 A1 | 5/2014 | Chien |
| 2014/0136200 A1 | 5/2014 | Winter et al. |
| 2014/0172428 A1 | 6/2014 | Han |
| 2014/0200890 A1 | 7/2014 | Kurniawati et al. |
| 2014/0278435 A1 | 9/2014 | Ganong et al. |
| 2014/0337030 A1 | 11/2014 | Lee et al. |
| 2014/0337031 A1 | 11/2014 | Kim et al. |
| 2014/0358539 A1 | 12/2014 | Rao et al. |
| 2015/0025890 A1 | 1/2015 | Jagatheesan et al. |
| 2015/0066495 A1 | 3/2015 | Zhang et al. |
| 2015/0073795 A1 | 3/2015 | Tan |
| 2015/0081296 A1 | 3/2015 | Lee et al. |
| 2015/0095027 A1 | 4/2015 | Parada San Martin et al. |
| 2015/0154953 A1 | 6/2015 | Bapat et al. |
| 2015/0279358 A1 | 10/2015 | Kingsbury et al. |
| 2015/0302847 A1 | 10/2015 | Yun et al. |
| 2015/0340032 A1 | 11/2015 | Gruenstein |
| 2015/0371631 A1 | 12/2015 | Weinstein et al. |
| 2015/0371633 A1 | 12/2015 | Chelba |
| 2016/0066113 A1 | 3/2016 | Elkhatib et al. |
| 2016/0071516 A1 | 3/2016 | Lee et al. |
| 2016/0098999 A1 | 4/2016 | Jacob et al. |
| 2016/0111086 A1 | 4/2016 | Ziolko et al. |
| 2016/0140956 A1 | 5/2016 | Yu et al. |
| 2016/0180839 A1 | 6/2016 | Tomita |
| 2016/0188573 A1 | 6/2016 | Tang |
| 2016/0189706 A1 | 6/2016 | Zopf et al. |
| 2016/0379632 A1 | 12/2016 | Hoffmeister et al. |
| 2016/0379638 A1 | 12/2016 | Basye et al. |
| 2017/0004824 A1 | 1/2017 | Yoo et al. |
| 2017/0133038 A1 | 5/2017 | Jiang et al. |
| 2017/0148444 A1 | 5/2017 | Bocklet et al. |
| 2017/0256255 A1 | 9/2017 | Bocklet et al. |
| 2017/0270919 A1 | 9/2017 | Parthasarathi |
| 2017/0294188 A1 | 10/2017 | Hayakawa |
| 2018/0005633 A1 | 1/2018 | Bocklet et al. |
| 2018/0121796 A1 | 5/2018 | Deisher et al. |
| 2018/0182388 A1 | 6/2018 | Bocklet et al. |
| 2018/0261218 A1 | 9/2018 | Bocklet et al. |
| 2018/0322876 A1 | 11/2018 | Bocklet et al. |
| 2019/0043488 A1 | 2/2019 | Bocklet et al. |
| 2019/0043529 A1 | 2/2019 | Muchlinski et al. |

OTHER PUBLICATIONS

Notice of Allowance for U.S. Appl. No. 16/034,006, dated Aug. 31, 2018.

Sackinger et al.; "Application of the ANNA Neural Network Chip to High-Speed Character Recognition"; 21 pages; Mar. 18, 1991.

Chen, et al., "Small-Footprint Keyword Spotting Using Deep Neural Networks", 2014 IEEE International Conference on Acoustics, Speech and Signal Processing (ICASSP), May 4-9, 2014, pp. 4087-4091.

Rose, et al., "A Hidden Markov Model Based Keyword Recognition System", 1990 ICASSP-90, vol. 1, 1990 International Conference on Acoustics, Speech, and Signal Processing, Apr. 3-6, 1990, pp. 129-132.

Zhang, et al., "Unsupervised Spoken Keyword Spotting via Segmental DTW on Gaussian Posteriorgrams", in Proceedings of Automatic Speech Recognition & Understanding Workshop (ASRU 2009), IEEE, 2009, Merano, Dec. 2009, pp. 398-403.

European Search Report for EP Patent Application No. 19172588.6, dated Oct. 14, 2019.

Fujimoto, et al., "Frame-wise model re-estimation method based on Gaussian pruning with weight normalization for noise robust voice activity detection", Speech Communication, Elsevier Science Publishers, Amsterdam, NL, vol. 54, No. 2, Aug. 25, 2011, pp. 229-244.

Li, et al., "Robust Endpoint Detection and Energy Normalization for Real-Time Speech and Speaker Recognition", IEEE Transactions on Speech and Audio Processing, vol. 10, No. 3, Mar. 1, 2002.

METHOD AND SYSTEM OF NEURAL NETWORK KEYPHRASE DETECTION

BACKGROUND

Keyphrase detection (such as Wake-on-Voice), or hot word detection systems may be used to detect a word or phrase or the like, which may initiate an activity by a device. For example, the device may wake by transitioning from a low power or sleep mode to an active mode, and/or may wake a particular computer program such as a personal assistant (PA) application. In this case, the detection of a waking keyphrase may activate an automatic speech recognition application to understand a command incoming from a user. For example, a user may state "Alexa, what is the weather?" where the word "Alexa" is the waking keyphrase.

Current keyphrase detection systems may model context-dependent phones of keyphrases and may use Gaussian mixture models (GMMs) to model the acoustics of the variations. Such models, however, are often too complex for implementation in low resource (for example, compute resource, memory resource, and power resource) environments. For example, often keyphrase decoding is performed by digital signal processors (DSPs) that have relatively high power consumption that is increased even further when such dense keyphrase decoding computations are performed. Such decoding also is typically based on whole-word scores requiring the training of a new specific word or phrase model whenever a new keyphrase is added to the system. Also, speech/non-speech detection is usually a separate module performed on a DSP and that is difficult to integrate with the other keyphrase detection operations, thereby increasing computational complexity and power consumption as well.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
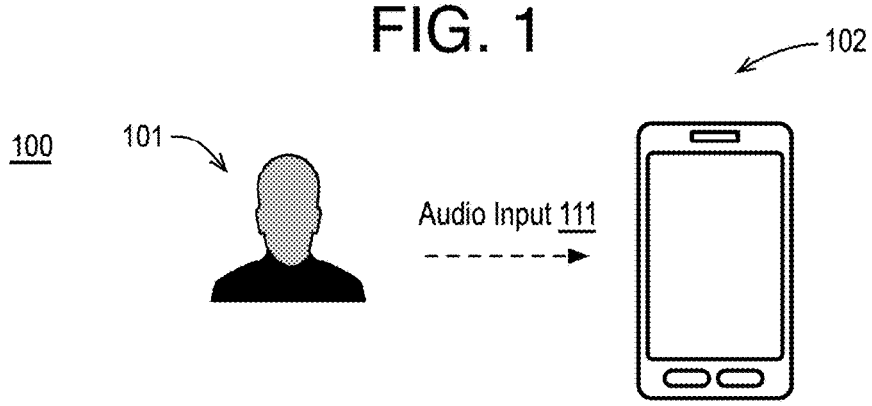
FIG. 1 is an illustrative diagram of an example setting for providing keyphrase detection.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips (e.g., including digital signal processors, dedicated hardware, or the like) and/or packages, and/or various computing devices and/or consumer electronic (CE) devices such as set top boxes, smart phones, smart speakers, automobile systems, security systems, or any other device or system that can implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof unless described otherwise, where an implementation may be limited to a neural network accelerator (NNA) for example. The material disclosed herein also may be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Methods, devices, apparatuses, computing platforms, and articles are described herein related to neural network keyphrase detection.

As described above, keyphrase or hot word detection systems may be used to detect a word or phrase or the like, which may initiate an activity by a device such as waking the device from a low power or sleep mode to an active mode, or waking a certain application, based on detection of the keyphrase. As used herein, the term keyphrase may indicate any audio indicator or acoustic event to be detected such as a phrase, a word, part of a word, syllable, or a group of phones, or an audio or acoustic event such as a baby's cry, a scream, or the like. Furthermore, the keyphrase may be predetermined for use by the system such that detection of a predetermined keyphrase may be provided. The predetermined keyphrase may be predefined (e.g., user independent and predefined by the application) or user-defined (e.g., a user may train a detection system to recognize the keyphrase). As used herein, the term predetermined keyphrase includes any such predefined and/or user-defined keyphrase(s).

Also as mentioned above, the conventional keyphrase detection systems use a large volume of complex computations requiring the use of DSPs and/or other hardware that increases expenses and causes greater power consumption. One solution is to use neural networks that use matrix multiplication to reduce computational loads and complexity. Some conventional neural network keyphrase detection systems take advantage of this and typically provide two outputs: either indication of a keyphrase or non-keyphrase. These conventional neural network systems, however, require retraining of the network each time a new keyphrase is added to the network because such networks typically construct entire words and provide a word score for each word, which is considered less accurate than systems that are based on phoneme scores rather than entire word scores. However, the speech/non-speech modules usually have their own complex computations performed by DSPs as well. Other operations typically performed by a DSP, even those within the keyphrase detection itself such as feature extraction, could benefit by using an all-neural network system rather a DSP to reduce further power consumption.

To resolve these issues, the present method and system use a neural network keyphrase detection decoder (or keyphrase detection or Wake on Voice (WoV) engine or just keyphrase decoder) that can be used in a start-to-finish neural network keyphrase detection system that limits or eliminates the need for a DSP and instead can be processed on highly efficient neural network accelerators in an autonomous, stand-alone manner. This can achieve ultra-low power consumption compared to conventional systems. The disclosed neural network keyphrase detection decoder enables sub-phonetic-based keyphrase detection with rejection modeling in a neural-network structure that can be operated by a neural network accelerator for example. This can be said to effectively "neuronize" the scoring at the keyphrase decoder by performing the scoring as a recursive neural network. Once operations for a neural network keyphrase decoder structure is established, a number of different extensions can be applied that can provide additional optional features that can be implemented by neural network accelerators as well and as described below.

Now in more detail, the keyphrase scoring is performed by using a recursive neural network updating data structure that receives as input multiple element acoustic score vectors of sub-phoneme, phoneme and/or multi-phoneme (e.g., triphones) acoustic scores as well as a rejection score. The recursive neural network operates a rejection model and a keyphrase model of a keyphrase decoder. Thus, the outputs (i.e., phonetic posterior values) of any acoustic scoring deep neural network can be re-ordered and scored within the present recurrent network structure.

Vectorized operations at the keyphrase decoder are then performed. Such a vector and sub-phonetic-based data structure for a keyphrase detection decoder is disclosed by U.S. Patent Publication No. 2018/0182388, published on Jun. 28, 2018, which is incorporated herein for all purposes. The vectorized operations include combining the multiple element acoustic score vector with a previous multiple element state score vector to generate a vector of intermediate score values. Such combining of vectors, by one example, involves an element by element summation of the vectors. A propagation operation is then performed on the vector of intermediate score values to generate a new current multiple element state score vector. The propagation from state to state along the multiple element state score vector is accomplished by performing a maximum pooling or other downsampling operation between adjacent scores along the vector of intermediate scores to establish a current multiple element state score vector. The present method and system described herein adjusts these operations so that the decoder can be implemented as a recursive neural network to be performed by one or more neural network accelerators rather than a DSP. For example, the recurrence feature may be achieved by using the latest current multiple element state score vector as a previous multiple element state score vector that is combined with the multiple element acoustic score vector, effectively forming a backward loop (or arc). The scores forming the previous multiple element state score vector may be treated as bias values for input through a bias pathway of a neural network accelerator to create the backward operation of the recurrence. Each time (or some interval) a current multiple element state score vector is generated, one or more scores on the resulting current multiple element state score vector may be used to determine if a keyphrase has been detected or not. By one form, such a determination is established by using the scores, such as a rejection score and a score for the keyphrase model, of the current multiple element state score vector as inputs to an affine layer with certain weights on the scores to output a final score as described in the details below. The neural network decoder operations also can handle multiple keyphrases either by handling input acoustic score vectors each of a different keyphrase in parallel or by concatenating such vectors for input to the neural network keyphrase decoder.

Also as explained further below, the present method and system of neural network keyphrase detection can be extended to add a number of features mainly, or substantially, operated by using a neural network. Thus, for example, robust speech/non-speech detection can be integrated into the neural network layer operations of the keyphrase decoder to eliminate the need for a separate DSP operated speech/non-speech detection module. This may be accomplished by using pooling of rejection speech and non-speech categories (phonetics, speech noise, silence, and non-speech noise, for example) of acoustic scoring to form rejection score vectors that can be input for the same updating neural network operations of the described recursive neural network keyphrase decoder. The result of the robust integrated speech/non-speech detection can be used to implement a neural-network-based dynamic buffer size control to change buffer sizes depending on whether speech is present, and the neural-network-based noise detection from the rejection scoring can be used to control which microphones are active on a multiple microphone system. Additionally, on-the-fly keyphrase endpoint detection can be performed by adding a dummy state to the input vectors for the keyphrase decoder, while the keyphrase start point can be detected on-the-fly by using a recurrent neural network booling process after the keyphrase decoding as described below.

Thus, the neural network keyphrase detection decoder also may be integrated into an end-to-end neural network keyphrase detection system. By one example, a temporal-domain feature extraction system may be used and that uses delta-modulation, finite impulse response (FIR) filtration, and an energy operation-based (or in other words, a Parseval Theorem-related operation) accumulator that is used to generate mel-frequency cepstrum coefficients (MFCCs) and/or mel-frequency spectrum coefficients (MFSCs) to be used for acoustic scoring. Such a system eliminates the complex and heavy load of computations of fast Fourier Transform (FFT) in favor of the delta modulation that provides indicators of changes in the audio signal or data, and uses those indicators to modify mel-frequency coefficients and sum the resulting values. This is performed without the use of multiplication for efficient FIR filtering that can be performed by specific purpose logic or an accelerator rather than a DSP. Such a system is disclosed by U.S. patent application Ser. No. 16/022,376, filed Jun. 28, 2018, and published as U.S. Patent Publication No. 2019/0043477, published on Feb. 7, 2019, which is incorporated herein for all purposes.

Also, acoustic scoring is already known to be performed by deep neural networks that can be operated by NN accelerators, and now the keyphrase detection decoder may be performed by neural networks as well while integrating keyphrase start and end point detection as well as speech/non-speech detection as disclosed herein so that these keyphrase start/end and speech/non-speech detection do not need to be a DSP process separate from the neural network decoding either. Such start-to-end neural network keyphrase detection processes may be implemented on Intel's Gaussian mixture model and neural network accelerator (GNA) and/or autonomous neural network accelerator (ANNA) to name a few examples, and as described below as well. Herein, a neural network accelerator (NNA) refers to a specific-purpose processor that is specifically arranged to process a neural network. Such an NNA at least has specific logic hardware for vectors of input data to be propagated through a neural network, input weights for nodes on the network, and input bias and/or constants to be applied, as well as a propagation circuit such as a multiply-accumulate circuit for example, and an activation function unit. The NNA should have the ability to run in an always listening manner and should process data from a D-Mic directly (albeit with some added buffer) in order to be able to run in a completely or substantially autonomous manner. Such a system also should have a way to model the recursiveness as discussed below.

These solutions also permit other advantages such as keyphrase model generation via text acoustic training and/or keyphrase model generation by using a user's voice as disclosed by U.S. Patent Publication No. 2018/0005633 published on Jan. 4, 2018, and/or simultaneous speech/non-speech detection as disclosed by U.S. patent application Ser. No. 16/001,496, filed Jun. 6, 2018, and published as U.S. Patent Publication No. 2019/0043529, on Feb. 7, 2019, which are also incorporated herein in their entireties for all purposes, while still allowing all (or substantially all, or mostly all) neural network access. These structures and methods result in a significant power-efficient solution and raises "always listening" applications to a new level in power efficiency.

Referring now to FIG. 1, an example setting 100 for providing keyphrase detection is arranged in accordance with at least some implementations of the present disclosure. The setting 100 may include a user 101 providing audio input 111 to a device 102. For example, device 102 may be in a deep sleep or power saving mode or the like, and user 101 may be attempting to wake device 102 via keyphrase detection. If user 101 provides audio input 111 that is identified as the keyphrase of device 102, device 102 may wake from a sleep or power saving mode, perform a task, or the like. For example, device 102 may provide an automatic wake on voice capability for user 101. By other examples, wake-on-voice, or more generally keyphrase detection, may refer to a situation where the device is already awake and performing other tasks, such as playing music, and the keyphrase detection triggers the waking of a specific program or application such as a personal assistant (PA) for example. In such a case, the keyphrase detection may wake an automatic speech recognition (ASR) application to understand a command or request to instruct the PA to perform a task. As shown, in some examples, an automatic wake on voice system may be implemented via device 102 such that device 102 may be a smartphone. However, device 102 may be any suitable device that handles such audio processing as described herein such as a smart speaker, computer, a laptop, an ultrabook, a smartphone, a tablet, a phablet, a wearable device such as a smart watch, smart headphones, or eye glasses, or the like. In any case, device 102 may be described as a computing device as used herein.

As shown, in some examples, user 101 may provide audio input 111 in an attempt to wake device 102 or the like. As will be appreciated, device 102 also may receive as audio input background noise, silence, background speech, speech not intended to attain access to device 102, its own playback such as when playing music or other media, and the like. For example, device 102 may need to differentiate or classify audio (for example, audio input 111 or other audio) that does not match a predetermined keyphrase as provided by a rejection model, for example, from audio that matches the predetermined keyphrase as provided by a keyphrase model for example and as discussed herein. Such a classification process may use a rejection model that may classify the non-keyphrase audio as rejected phonetics, spoken noise, non-speech noise, and silence by one example and as explained below.

Figure 2:
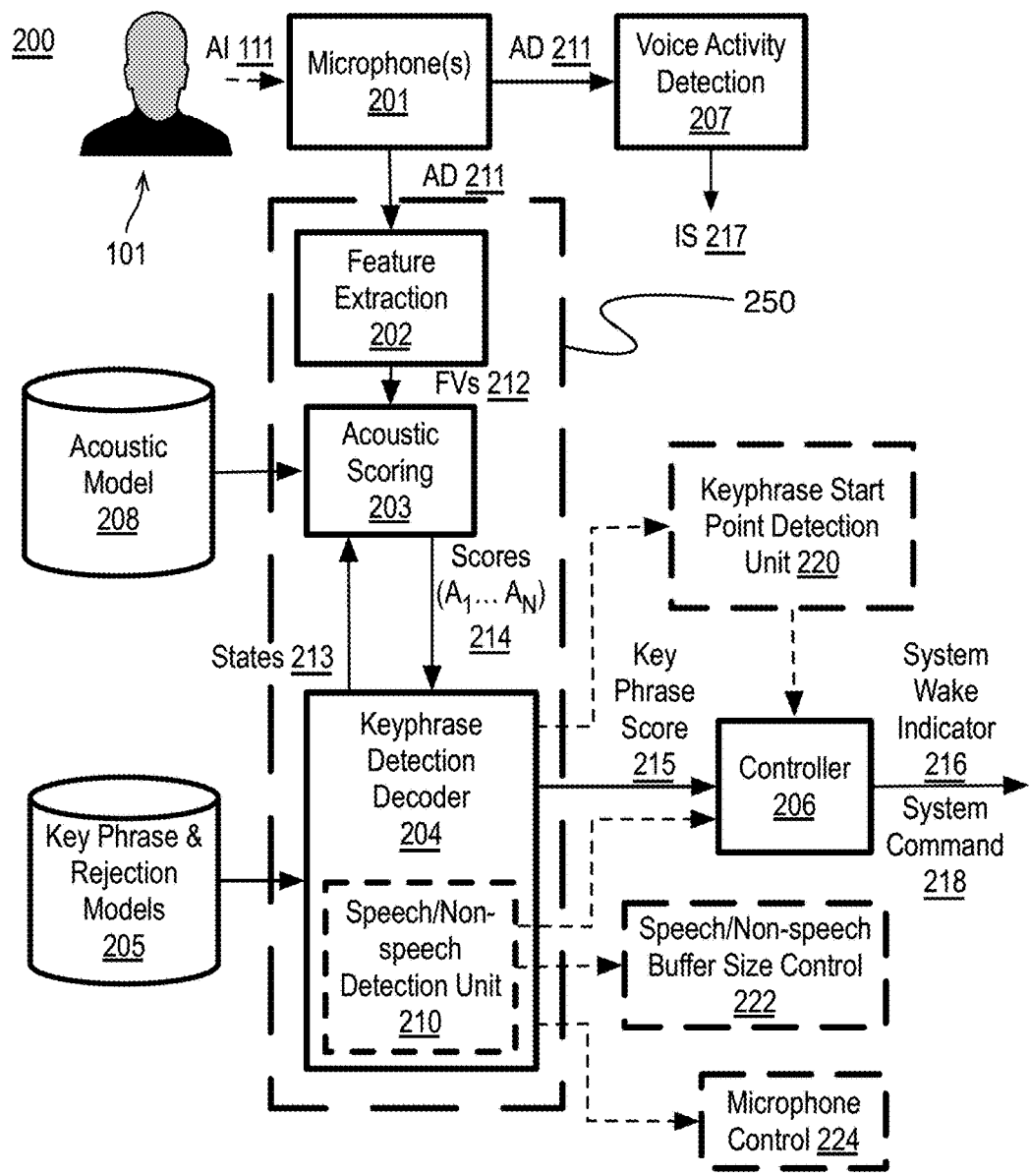
FIG. 2 is a schematic diagram of an example audio processing system to perform at least one of the implementations described herein.

Referring to FIG. 2, an example audio processing system 200 for keyphrase detection is arranged in accordance with at least some implementations of the present disclosure. System 200 may include, or be communicatively connected to, one or more microphones 201 such as an array of microphones, a feature extraction module 202, an acoustic scoring module 203, a keyphrase detection decoder 204, keyphrase and rejection models 205, a controller 206, an acoustic model 208, and a voice activity detection module 207. The system 200 optionally also may have an integrated speech/non-speech detection unit 210, a keyphrase start point detection unit 220, speech/non-speech buffer size control 222 and a microphone control 224. One advantage of the audio processing system 200 is that it avoids substantial use of a DSP in a keyphrase detection unit 250 that has main modules of keyphrase detection for feature extraction, acoustic scoring and decoding. Thus, it avoids a separate DSP operation of each of these modules so that no "compute" distinction exists between the feature extraction, acoustic scoring and keyphrase decoding. In other words, and generally speaking, the results of neural network layers of one of the modules can be input to neural network layers of the next module without separate operations to provide the data to a DSP for calculations. The result is autonomous neural network acceleration able to substantially provide keyphrase detection without substantial reliance on other processor units thereby reducing computational loads and power consumption which improves the functions of small computing devices and "always on" devices to name a few examples.

In more detail, the keyphrase detection decoder 204 may provide one or more keyphrase scores 215 (or value(s) based on a keyphrase score) to controller 206. Based on one or more final keyphrase scores 215 (e.g., if keyphrase score 215 is greater than a threshold or the like), controller 206 may provide a system wake indicator 216 (e.g., if keyphrase score 215 indicates a predetermined keyphrase or one of several predetermined keyphrases has been matched), or controller 206 may not provide such an indicator and system 200 may continue evaluating input speech for a match. As shown, in some examples, controller 206 also may provide a system command 218 associated with the keyphrase to request system 200 to perform an operation such as starting an application, generating or retrieving data, or the like. As is discussed further herein, in some implementations, feature extraction module 202, acoustic scoring module 203, and keyphrase detection decoder 204 are performed on at least one neural network accelerator and dedicated specific-purpose hardware rather than a digital signal processor (DSP). The controller 206, and voice activity detection module 207 still may be implemented via a digital signal processor (DSP), and in other options, the feature extraction unit 202 uses a DSP.

As discussed, system 200 may implement a single keyphrase such that, upon detection of the keyphrase, system wake indicator 216 and/or system command 218 may be provided. In other implementations, system 200 may implement multiple keyphrases (based on implementing multiple keyphrase models as discussed herein). In such implementations, if any of the keyphrases are detected, system wake indicator 216 and/or system command 218 may be provided. Furthermore, system command 218 may be associated with a particular keyphrase of the keyphrases. For example, a first wake up command (e.g., keyphrase) such as "Computer, Play Music" may wake the device (e.g., via system wake indicator 216) and play music (e.g., via a music play command implemented by system command 218) and a second wake up command (e.g., keyphrase) such as "Computer, Do I Have Mail?" may wake the device (e.g., via system wake indicator 216) and determine whether mail has been received (e.g., via a get mail command implemented by system command 218). In these examples, the sequence of these words forming the entire phrases may or may not be trained as waking keyphrases. By yet other options, the device itself may already be awake and performing an activity, such as playing music or a movie or running any other application, and the waking keyphrase triggers the controller 206 to activate a certain program such as an automatic speech recognition (ASR) application for a PA application to understand a command that is not a keyphrase for example. Thus, for example, in the phrase "Alexa, tell me the weather", only the word "Alexa" is a keyphrase.

As shown, microphone 201 may receive audio input (AI) 111 from user 101 (or multiple users or an environment or the like). Audio input 111 may include any speech issued by user 101 and any other background noise or silence or the like in the environment of microphone 201. Audio input 111 may be characterized as audio, input audio, an input speech stream, or the like. Microphone 201 may receive audio input 111 and/or other audio (e.g., as sound waves in the air) and convert audio input 111 and/or such other audio to an electrical signal such as a digital signal to generate audio data (AD) 211. For example, audio data 211 may be stored in memory (not shown in FIG. 2), transferred for continued processing, or the like.

A voice activity detection module 207 may receive audio data 211. For example, voice activity detection module 207 may operate (for example, via a DSP) even in a deep sleep mode of system 200 to continuously monitor audio data 211. Upon detection of a voice or other sound that requires further evaluation by system 200, voice activity detection module 207 may provide initiation signal (IS) 217, which may activate the other modules of system 200 to provide keyphrase detection. For example, voice activity detection module 207 may provide initiation signal 217 to feature extraction module 202 to activate feature extraction module 202 and other components of system 200. In an implementation, a portion of audio data 211 (e.g., 360 ms of audio data or the like) may be buffered by a ring-buffer or the like. When a voice or other sound that requires further evaluation is detected by voice activity detection module 207, feature extraction module 202 may receive the data from the buffer and further incoming audio via audio data 211.

Furthermore, voice activity detection module 207 may operate during keyphrase detection (e.g., while a keyphrase is not detected or not yet detected) to determine whether system 200 may be put back into a deep sleep mode or the like. For example, voice activity detection module 207 may provide a low power always listening capability for system 200. For example, upon activation by initiation signal 217, audio data 211 may be continuously monitored for keyphrase detection until controller 206 determines a keyphrase has been detected and system wake indicator 216 is provided or until a determination is made by voice activity detection module 207 to reenter a sleep mode or low power state or the like.

Feature extraction module 202 may receive audio data 211. For example, feature extraction module 202 may receive audio data 211 from microphone 201, from the discussed buffer, from other memory of system 200, or the like and feature extraction module 202 may generate feature vectors 212 associated with audio input 111. Feature vectors 212 may be any suitable features or feature vectors or the like representing audio input 111, and as mentioned above, may be provided without the use of a DSP by using specific-purpose hardware and/or a neural network accelerator instead. For example, feature vectors 212 may be a time series of feature vectors (e.g., feature vectors each generated for an instance of time) such that each of feature vectors 212 includes a stack of features or feature vectors each from an instance of time such as a sampling time or the like. Specifically, feature vectors 212 from the feature extraction unit 202 may be provided at multiple sampling times in the form of the (MFCCs) mentioned above or the like may be generated. The sampling times may be at any suitable interval such as every 10 ms or the like and the sampling performed at each sampling time may sample any duration of input speech or audio such as 25 ms of audio or the like. The coefficients of the feature vectors 212 may include any number of sampling coefficients but is usually related to the mel-frequency scale and may include such as 13 to 40 coefficients by one example. Furthermore, the coefficients may each be referred to as features, a feature vector, a sampling, or the like. By one example, the non-DSP feature extraction is used as mentioned above and based on audio input 111 using the non-FFT and energy operation accumulation approach as mentioned above. For another example, DSPs may be used when using a Fourier transform of audio input 111 and/or audio received via microphone 201. Either way, the feature extraction unit 202 also may perform mapping to the Mel scale, determining logs of the powers at each Mel frequency, and determining the Mel frequency cepstrum coefficients based on a discrete cosine transform (DCT) of the logs of the powers.

The sampling coefficients may be stacked or concatenated or combined or the like to generate feature vectors 212 after being normalized or the like by cepstral mean normalization or the like to generate the coefficients for example. The coefficients may be combined to generate each feature vector 212 such that each feature vector is a 143 (e.g., 11×13) dimensional vector by one possible example. However, any number of instances of sampling coefficients may be combined or stacked to generate feature vectors 212. The feature vectors 212 may include sampling coefficients with overlapping time ranges such that a first feature vector may be associated with times $t_0$-$t_{10}$, while a next feature vector may include sampling coefficients associated with times $t_1$-$t_{11}$ for example.

Also, the feature vectors 212 may be provided to acoustic scoring module 203. Acoustic scoring module 203 may score feature vectors 212 based on acoustic model 208 as received via memory and provide any number of output scores 214 based on feature vectors 212. The acoustic scoring may be performed by using a neural network implemented as acoustic scoring module 203 and using the acoustic model 208 in some implementations. Such acoustic scoring may have any suitable neural network such as an artificial neural network, a deep neural network (DNN), a convolutional neural network (CNN), or the like. Here, this may include a time delay DNN (T-DNN) that may use a bottleneck layer (such as a 1×1 point-wise layer) before a full DNN/T-DNN layer. Such networks may include a neural network with an input layer, hidden layers, and an output layer with any suitable number of nodes such as a number of nodes equal to the number of elements in each of feature vectors 212. For example, the input layer may have 143 nodes corresponding to each of the 143 dimensions of feature vectors 212. In other examples, feature vectors may have fewer or more elements or dimensions and the input layer may have a corresponding number of nodes. The output layer may include any suitable number of nodes such that acoustic scores 214 include values corresponding to tied context-dependent sub-phone or mono-phone, and/or multiple-phone, such as triphone states, or the like as mentioned below. In some examples, the neural network for acoustic scoring may implement Hidden Markov Models (HMMs). As discussed, in some implementations, the output layer may be pruned such that only predetermined output nodes (and associated acoustic scores 214) are provided such that a subset of available states or scores are implemented via the neural network.

In an implementation, acoustic scoring module 203 receives and implements acoustic model 208 as discussed herein. In an implementation, acoustic model 208 may be a deep neural network (DNN) pretrained based on a training set of audio. In an implementation, acoustic model 208 may be a deep neural network having any number of outputs such as 4,000 outputs or the like. In another implementation, acoustic model 208 is a pruned deep neural network having the number of outputs reduced or pruned such that only a subset of available outputs (e.g., as determined set-up and/or training) are provided or activated. Such required outputs may be provided by states signal 213 or such required outputs may be preset or pretrained prior to implementation.

Output acoustic scores 214 may be characterized as scores, probabilities, scores of sub-phonetic units, probability density function scores (PDFs), or the like. For example, acoustic scoring module 203 may generate such output scores or states for each of feature vectors 212 to generate a time series of acoustic scores 214. These acoustic scores 214 are represented as input acoustic scores $P_0$ to $P_n$ at the decoder 204 (or decoder data structure 400 on FIG. 4). By one example, acoustic scores 214 may be a time series of scores of sub-phonetic units.

As mentioned, the outputs 214 of acoustic scoring module 203 may represent sub-phonetic units such as tied context-dependent triphone states. Such tied context-dependent triphone states may represent monophones tied to monophones on either side (e.g., left and right) to generate tied context-dependent triphones. A language, for example, may have a number of monophones (e.g., 30-50 monophones) and sub-phonetic units such as exemplary tied context-dependent triphone states may include each of such monophones in a variety of contexts such that various other monophones are before and after such monophones to generate many combinations (e.g., the sub-phonetic units). Acoustic scoring module 203 may, based on feature vectors 212, provide probabilities or scores or the like associated with such sub-phonetic units (e.g., probabilities or scores as to which unit or phone has been spoken) as well as probabilities or scores associated with silence and/or background noise or the like at its outputs.

For each or some of acoustic scores 214, keyphrase detection decoder 204 may generate a corresponding keyphrase score 215. A keyphrase score 215 may be generated at each time instance as associated with scores 214. In other examples, a keyphrase score 215 may be generated at less frequent time intervals. As discussed further herein, in generating keyphrase score 215, keyphrase detection decoder 204 may implement vectorized operations on score vectors implemented as one or more neural networks.

Also, as shown, keyphrase detection decoder 204 may receive and implement a keyphrase model (or multiple keyphrase models) and a rejection model. For example, keyphrase detection decoder 204 may receive a key phrase model (or multiple keyphrase models) and a rejection model (e.g., keyphrase and rejection models 205) from memory. For example, keyphrase detection decoder 204 may receive and implement any rejection and keyphrase models discussed herein. The models are updated by using the vectorized operations on neural networks. The details for using the rejection and keyphrase model while implementing neural networks is provided below.

Furthermore, as discussed, in some implementations, a single keyphrase may be detected and a system may be woken (e.g., via system wake indicator 216) and an optional command may be issued (e.g., via system command 218) based on the detected keyphrase. In other implementations, a second or additional keyphrases may be implemented and associated keyphrase models may be evaluated by keyphrase detection decoder 204. For example, such keyphrase models may be evaluated and associated keyphrase scores may be evaluated to determine whether a particular keyphrase of multiple keyphrases has been detected. For example, as discussed further herein, multiple keyphrase models may be provided. Thus, keyphrase detection decoder 204 may generate a keyphrase score or scores for each of such keyphrase models (and at multiple time instances) for evaluation by controller 206.

By another implementation, the keyphrase detection decoder 204 may be arranged to provide a speech/non-speech detection unit 210 integrated with the decoder 204. This is performed by pooling different speech and non-speech rejection categories scored by the acoustic scoring unit 203, and performing a similar but parallel vectorized neural network operations relative to the keyphrase decoding. Speech and non-speech scores then may be provided by the Speech/Non-speech (S/N) detection unit 210 and/or decoder 204. The speech/non-speech scores may be used by the controller 206 to wake (or use rather than ignore) the keyphrase detection process itself, or other applications such as ASR for a PA, specific applications, and so forth. Otherwise, the speech/non-speech scores may be used by a speech/non-speech buffer size control 224 that modifies the size of audio data buffers depending on whether or not speech is present in the audio, thereby creating a neural network controlled buffer size. As yet another option, the noise scores (or non-speech noise score) or non-speech rejection score may be used to control which microphones are on or off on a microphone array or multiple microphone system in order to reduce power consumption, again based on neural network algorithms rather than computations on a DSP.

By yet another approach, on-the-fly keyphrase endpoint detection can be performed by adding a dummy state to the input vectors for the keyphrase decoder. This can be fully integrated into the updating keyphrase data structure as described herein. The keyphrase start point can be detected on-the-fly by a keyphrase start point detection unit 220 that uses a recurrent neural network booling process. Thus, the keyphrase start point detection unit 220 may receive the keyphrase current multiple state score vector as an input, modifies those scores, and converts them to propagation indicators that indicate whether a score position (or state) has been propagated on an HMM for example, from state to state along the multiple element state score vector. Vectors of these indicators (or bool vectors) are used to form a recurrently formed vector of frame index values. The index values indicate which audio frame of a frame sequence forming audio input being analyzed has the start point of the keyphrase. The details are provided below.

Controller 206 may receive keyphrase score 215 (e.g., a time series of keyphrase scores) and controller 206 may compare keyphrase score 215 to a threshold or the like to determine whether the predetermined keyphrase has been detected. For example, if keyphrase score 215 is greater than (or greater than or equal to) the threshold, the predetermined keyphrase has been detected and controller 206 may provide system wake indicator 216 to wake system 200. If keyphrase score 215 is less than (or less than or equal to) the threshold, the predetermined keyphrase has not been detected and controller 206 may not provide system wake indicator 216 and controller may continue to monitor keyphrase score 215.

When multiple keyphrases are being detected, controller 206 may receive such keyphrase scores (e.g., a time series of keyphrase scores) and controller 206 may compare such keyphrase scores to a threshold or respective thresholds to determine whether any of the predetermined keyphrases have been detected. For example, if any of the keyphrase scores is greater than (or greater than or equal to) the threshold or its respective threshold, a particular predetermined keyphrase has been detected and controller 206 may provide system wake indicator 216 to wake system 200 and an optional command indicator (e.g., system command 218) to perform a command associated with the particular predetermined keyphrase. If all of the keyphrase scores are less than (or less than or equal to) the threshold or their respective thresholds, controller 206 may not provide system wake indicator 216 and controller may continue monitoring for a predetermined keyphrase.

Figure 3:
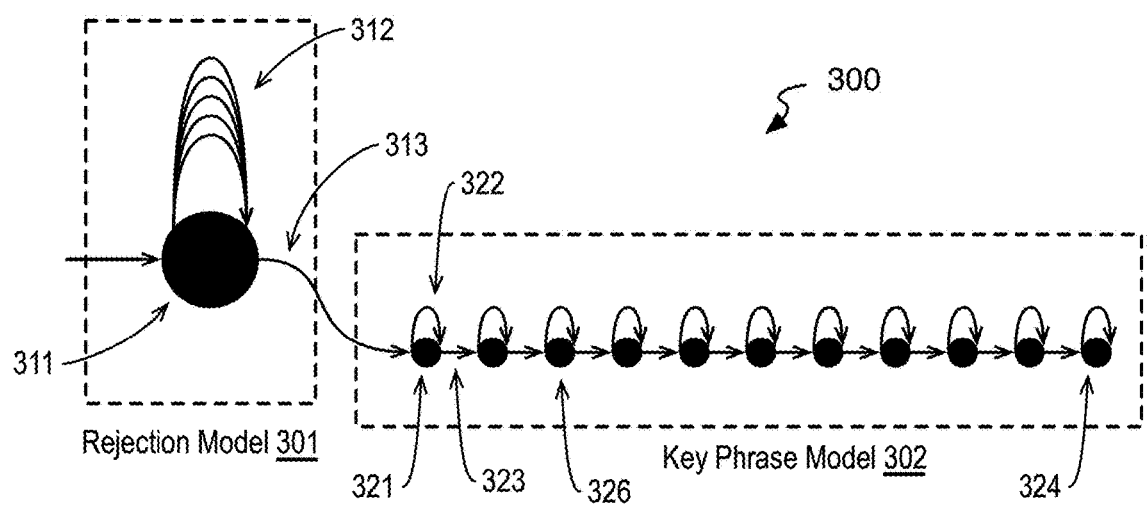
FIG. 3 is a schematic diagram of example model structures of a keyphrase decoder according to at least one of the implementations described herein.

Referring now to FIG. 3, the details for implementing the keyphrase detection decoder are provided. Specifically, implementations discussed herein include linearized scoring procedures for keyphrase sequence(s) or keyphrase model(s) to provide for a vectorized form of scoring that can be performed by using a neural network, and by one approach, particularly performed by a neural network accelerator (NNA). For example, some or all operations may be performed as vectorized operations for increased efficiency, decreased processing time, or the like. Such vectorized scoring may provide for operations applied to entire vectors of scores such as current acoustic scores (e.g., neural network outputs), previous scores of the keyphrase models and/or rejection model(s), or the like and to generate entire vectors of output scores for the keyphrase models and/or the rejection model(s) as discussed further herein. Such vectorized scoring may provide advantages in terms of computational efficiency and power usage by reducing or eliminating the use of a DSP. Furthermore, such vectorized scoring may be optimized via single instruction, multiple data (SIMD) instructions or the like to provide further computational efficiency as well as reduced memory requirements.

To achieve these advantages, a keyphrase detection decoder 300 has, or operates, an example rejection model 301 and an example keyphrase model 302, arranged in accordance with at least some implementations of the present disclosure. The rejection model 301 may include a single state 311 and multiple self loops 312. For example, single state 311 may correspond to a start state and may provide a single start state based rejection model. Furthermore, each of self loops 312 may be associated with one of acoustic scores 214, which are the outputs from acoustic scoring module 203 and that are input to decoder models 301 and 302, as described below. The self loops 312 provide self updates or summing or the like for single state 311 of rejection model 301. For example, each of self loops 312 may be associated with a deep neural network output or output node of an acoustic scoring DNN and that corresponds to a sub-phonetic unit, spoken or non-spoken noise, or silence. Using such techniques, for example, single state 311 may provide a start state that implements a rejection model. Self loops 312 may include any number of self loops. For example, at each time instance of outputs from acoustic scoring module 203, rejection model 301 may be updated to provide a rejection likelihood score associated therewith. For example, self loops 312 may illustrate updates to single state 311 at each time instance of acoustic scoring outputs (for example, acoustic scores 214) from acoustic scoring module 203.

Also as shown in FIG. 3, keyphrase model 302 may be subsequent to rejection model 301 and connected by transition 313. Keyphrase model 302 may include multiple states (or nodes) 326 interconnected by transitions 323. As shown, states 326 may include an initial state 321 and a final state 324 such that transition 313 connects keyphrase model 302 to initial state 321, while transitions 323 interconnect subsequent states 326 including final state 324. Each of states 326 may include or be updated by one or more self loops such as self loop 322, and each of states 326 may be updated based on a transition of transitions 323 or transition 313 from a prior state in keyphrase model 302 or from rejection model 301. By one form, each self loop 322 (or arc) may be associated with or correspond to an acoustic scoring DNN output (for example, a score of acoustic scores 214) from acoustic scoring module 203. In the illustrated example, each of states 326 has a single self loop 322. However, one or more of states 326 may each include multiple self loops. In some examples, one or more of states 326 may be silence states having self loops representative of silence such that keyphrases may be modeled that include silence. In some examples, one or more of states 326 may have both non-silence and silence self loops. Keyphrase model 302 may include any suitable model. For example, keyphrase model 302 may be selected based on the predetermined keyphrase implemented via system 200 and keyphrase model 302 may be selected based on a lexicon look up. For example, transitions 323 between states 326 may be selected based on the triphone-HMM-state sequence in the lexicon. In some contexts, keyphrase model 302 may be characterized as a keyphrase sequence or the like. For instance, a keyphrase sequence may represent sub-phonetic units, e.g., triphone states. For example, for the phrase "INTEL", the phoneme sequence would be IH2 N T EH1 L in ARPABET (which is a standard phoneme alphabet or phonetic transcription code) notation, the triphone sequence to form the keyphrase "INTEL" then may be:

eps/IH2/N IH2/N/T N/T/EH1 T/EH1/L EH1/L/eps.

Rejection model 301 and keyphrase model 302 may be initialized with all nodes or states thereof at null or negative infinity or the like. As mentioned, based on a first feature vector $FV_1$ for example, the acoustic scoring module 203 may generate acoustic scores 214, and single state 311 of rejection model 301 and a first state (initial state 321 of keyphrase model 302) may be updated one at a time starting with an acoustic score $A_1$. Upon a second feature vector $FV_2$ being processed, acoustic scoring module 203 may generate acoustic score $A_2$, and single state 311 of rejection model 301 and first state 321 of keyphrase model 302 is updated with state $A_2$, while acoustic score $A_1$ is transitioned to the second state 326 of keyphrase model 302 to update the second state 326, and so on. Such processing may continue to fill all of the states 326 on the keyphrase model 302, and may continue until the final state 324 is updated from its initialization state to a meaningful scoring. At such a time instance (and subsequent time instances as updates continue), the score or probability or the like of single state 311 and the score or probability or the like of final state 324 may be used to determine whether the predetermined keyphrase has been detected.

Specifically, based on rejection model 301 and keyphrase model 302, at each or some time instances, a rejection likelihood score and a keyphrase likelihood score may be determined. For example, the rejection likelihood score may be a score associated with single state 311 of rejection model 301, and the keyphrase likelihood score may be associated with final state 324 of states 326 of keyphrase model 302. Thus, for example, a time series of keyphrase scores 215 may be generated by keyphrase detection decoder 204 based on acoustic scores 214, rejection model 301, and keyphrase model 302.

Keyphrase scores 215 may include any suitable keyphrase score that compares the likelihood generated at single state 311 with the likelihood generated at final state 324. By one form, this may involve applying an equation (described below) that finds the difference between the two likelihoods and compares the difference to a threshold. By one form, this is accomplished by the NNA by performing this determination as an affine layer with a single node and the threshold may be an additional input of the affine layer. The threshold and the two likelihoods are given weights to perform the equation. When all scores of the states 326 are to be entered into the affine layer, the other middle scores other than the score of the final weight and the score of the rejection state have a weight of zero to drop them from the neural network calculation.

Otherwise, in another implementation, a keyphrase score of keyphrase scores 215 may be a log likelihood ratio. For example, a keyphrase score of keyphrase scores 215 may be determined as shown in Equation (1):

$$KPS = \log(p(X|\text{KeyPhrase})) - \log(p(X|\text{Reject})) \quad (1)$$

where KPS may be the keyphrase score, X may be the current accumulation of feature vectors being evaluated, and p provides a probability X is a member of KeyPhrase or Reject.

States 326 of keyphrase model 302 may have the same structure such that each of states 326 has one ingoing transition, one outgoing transition (except for final state 324), and one self loop transition such that both the ingoing transition and the self loop are updated with the same score of acoustic scores 214. Furthermore, rejection model 301 is separate from keyphrase model 302 such that the rejection score corresponding to rejection model 301 may be determined separately from the scores of states 326 of keyphrase model 302. Also, as discussed, optional silences may be added to keyphrase model 302 by adding self loops to any of states 326 of keyphrase model 302. Further still, multiple (for example, parallel or concatenated) keyphrase models (as illustrated with respect to FIG. 8 or 9) may be provided in a single score-array (for example, vector). For the concatenated models (FIG. 9), a single descriptor may be used for multiple keyphrase sequences except that no transition connection exists between the two or more sequences as shown on FIG. 9. Another way to consider this structure is to state that a weight of 0 is passed from the end of one sequence to the beginning of the next sequence in the same single descriptor. The details are provided below.

Figure 4:
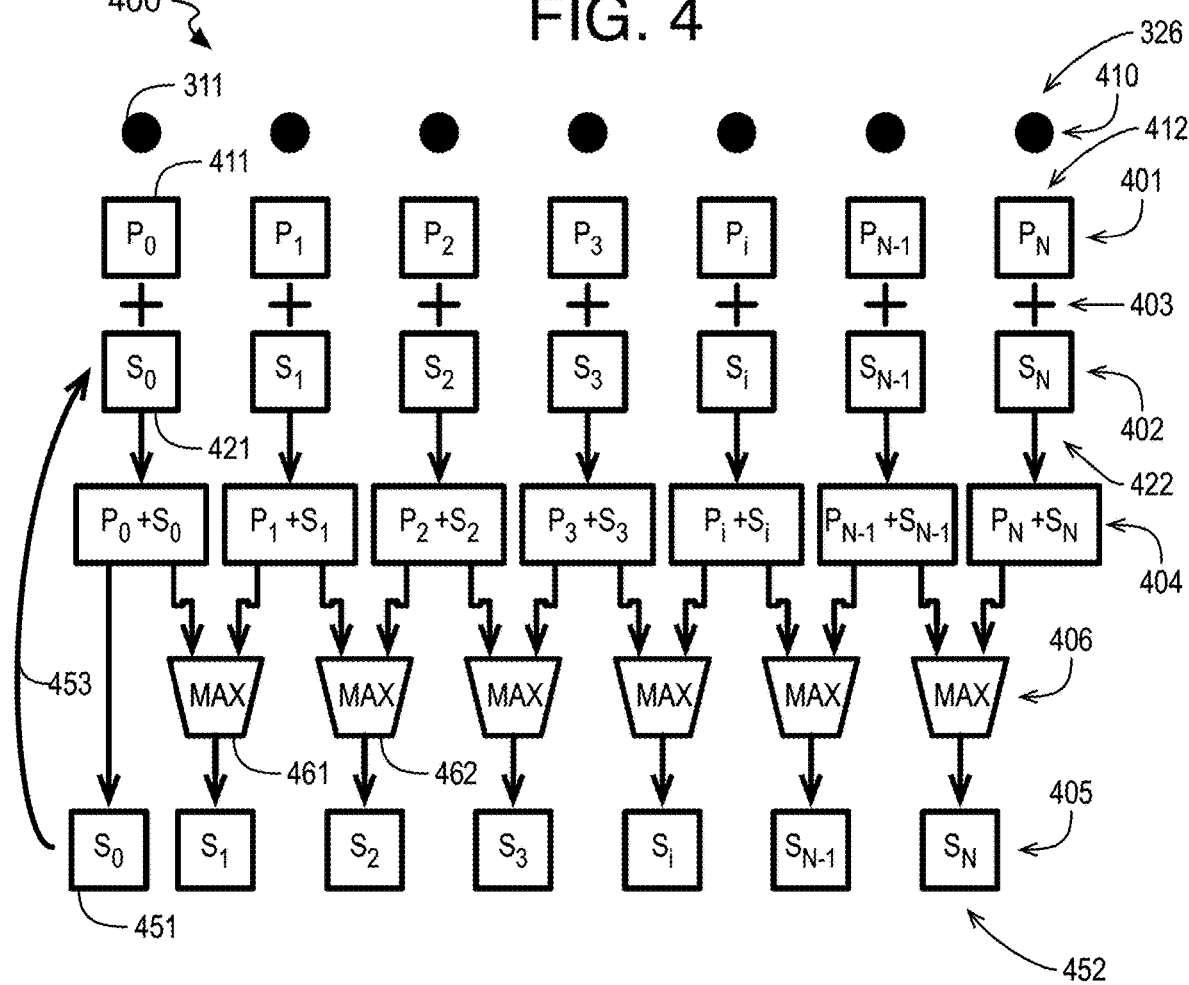
FIG. 4 is schematic diagram of an example updating data structure used at a keyphrase decoder according to at least one of the implementations described herein.

Referring to FIG. 4, an example decoder data structure 400 is provided for updating states of the rejection model 301 and one or more keyphrase models 302, arranged in accordance with at least some implementations of the present disclosure. The data structure 400 employs a linear implementation of keyphrase decoding using the regular decoder structure in the sense that each score in a generated multiple element state score vector for a keyphrase model sequence ($S_1$-$S_N$) is associated with an acoustic score DNN-output ($P_1$-$P_N$) represented by the arcs 322 mentioned above. Here, however, the decoding is performed in a way to efficiently implement the decoding as vector multiplication, which can be easily parallelized. Further modifications are made herein so that the computations can be performed on an NNA rather than a DSP or central processor. Rejection is handled separately; the acoustic score DNN-outputs associated with rejection modeling are max-pooled and stored in $P_0$. By that approach, the scoring can be completely, or at least mainly, vectorized and handled by an NNA rather than a DSP. The details are as follows.

The data structure 400 includes nodes (or states) 410 corresponding to the state 311 of the rejection model 301 and states 326 of the keyphrase model 302 (and additional keyphrase models, if used). Neural-network-based vector processing or vectorized operations may be performed to update the states corresponding to nodes 410 of the models at various time iterations to generate a multiple element state score vector 405 for a current time instance having a current state score 451 for single state rejection model 301 (designated score $S_0$) and current scores 452 for multiple state keyphrase model 302 or additional models, if used, and shown here to include scores $S_1, S_2, S_3, \ldots S_i, \ldots, S_{N-1}, S_N$, where $S_N$ is referred to as the last score (which may or may not correspond to the final state 324 of keyphrase model 302).

For a current time instance, a multiple element acoustic score vector 401 may be generated. As shown, multiple element acoustic score vector 401 may include a current acoustic score 411 (here $P_0$) for single state rejection model 301 and current acoustic scores 412 for multiple state keyphrase model 302 or additional models, if used (i.e., scores $P_1, P_2, P_3, \ldots, P_i, \ldots, P_{N-1}, P_N$). Multiple element acoustic score vector 401 may be generated using any suitable technique or techniques, and by one form, by using neural networks as mentioned above. In an implementation, multiple element acoustic score vector 401 includes acoustic scores 214 ($A_1$ to $A_N$) from acoustic scoring module 203 as discussed herein. For example, multiple element acoustic score vector 401 may be generated based on audio input 111 as discussed herein.

Also as shown, for a previous time instance, a previous multiple element state score vector 402 may be received from memory, for example, based on a previously completed iteration. As shown, previous multiple element state score vector 402 may include a previous score $S_0$ 421 for single state rejection model 301 and previous scores 422 for multiple state keyphrase model 302 or additional models, if used (i.e., scores $S_1, S_2, S_3, \ldots, S_i, \ldots, S_{N-1}, S_N$). Previous multiple element state score vector 402 may be generated in the same way that current multiple element state score vector 405 is generated. Thus, a current vector 405 is used in a recurrent manner as a previous multiple element state score vector. Such recurrent operation is represented by arrow 453 and the NNA operations to perform this operation are described below.

As shown, and at a current time iteration, a recurrent-based vectorized operation 403 is performed on multiple element acoustic score vector 401 and a previous multiple element state score vector 402 from a previous iteration to combine the vectors. By one form, the recurrence is formed by the two vectors 401 and 402 being summed on an element by element basis to generate an intermediate score vector 404 (also referred to as an intermediate multiple element score summation vector). Vectorized operation 403 may sum multiple element acoustic score vector 401 and multiple element state score vector 402 using array programming, based on SIMD instructions, or in a hardware implementation such that the element by element sums are performed by an NNA using an affine layer and the scores of the previous multiple element state score vector are input to the NNA as bias values to be summed with the values of the acoustic score vector. This generates the sums simultaneously, substantially simultaneously, in parallel, or the like. As shown, intermediate score vector 404 may include a rejection state value (labeled $P_0+S_0$) corresponding to a sum (or other operation) of the score for the single state rejection model and the previous state score for the single state rejection model followed by subsequent keyphrase model values (labeled $P_1+S_1, P_2+S_2, P_3+S_3, \ldots, P_i+S_i, \ldots, P_{N-1}+S_{N-1}, P_N+S_N$) corresponding to sums of scores for the multiple state keyphrase model and previous state scores for the multiple state keyphrase model. It will be understood that instead of element by element summation, an operation such as SIMD instructions on an array could be used.

Once the intermediate score vector 404 is formed, a vectorized propagation operation 406 may use the intermediate score vector 404 to effectively propagate intermediate scores (or at least propagate the factoring of the intermediate scores) along the multiple element state score vector from $S_1$ to $S_N$ to generate the current multiple element state score vector 405 in a way that can be performed by a NNA. By one approach, the vectorized operation 406 may determine a maximum intermediate score between adjacent elements (forming overlapping pairs of comparisons of elements) of intermediate score vector 404 to generate multiple element state score vector 405. For example, vectorized operation 404 may determine a maximum between the rejection state value (labeled $P_0+S_0$) and a first of keyphrase model values (labeled $P_1+S_1$) at operator 461, a maximum between the first of keyphrase model values (labeled $P_1+S_1$) and a second of keyphrase model values (labeled $P_2+S_2$) at operator 462, and so on through a last of keyphrase model values (labeled $P_N+S_N$).

Using such techniques, and with reference to FIG. 3, for each state 326 of keyphrase model 302, multiple element state score vector 405 may include the maximum of the incoming transition to the state and the self loop of the state. For example, with reference to state 321 and the first of current scores 452, which may correspond to one another, operator 461 provides a maximum of transition 313 to state 321 and self loop 322 of state 321. For example, transition 313 is provided by the previous state score of single state 311 of rejection model 301 (i.e., $S_0$) plus the current acoustic score of single state 311 of rejection model 301 (i.e., $P_0$) and self loop 322 is provided by the previous state score of state 321 (i.e., $S_1$) plus the current acoustic score of state 321 (i.e., $P_1$). Therefore, operator 461 provides, for state 321, the maximum of transition 313 (i.e., $P_0+S_0$) and self loop 322 (i.e., $P_1+S_1$) for score $S_1$ of multiple element state score vector 405. In analogy, each state 326 of keyphrase model may be provided with a maximum of the incoming transition to the state and the self loop of the state. Furthermore, current state score 451 for single state rejection model 301 (i.e., score $S_0$) is provided by the greatest score of self loops 312 plus the previous state score for single state 311 (i.e., $P_0+S_0$).

As mentioned, the resulting current multiple element state score vector 405 includes a current state score 451 for single state rejection model 301 (i.e., score $S_0$) and current scores 452 for multiple state keyphrase model 302 or additional models, if used (i.e., scores $S_1, S_2, S_3, \ldots, S_i, \ldots, S_{N-1}, S_N$). The multiple element state score vector 405 then may be used to evaluate audio input 111 at the current time instance. For example, current state score 451 for single state rejection model 301 may be compared to a last state $S_N$ which can be a final state score corresponding to, for example, final state 324 of keyphrase model 302 to determine whether the keyphrase corresponding to keyphrase model 302 has been detected. Such a comparison may be made using any suitable technique or techniques such as the application of an affinity layer to perform the determination on an NNA or alternatively could be performed by computing a difference, a log likelihood ratio as discussed with respect to Equation (1), or the like. The details for the NNA determination are provided below.

The operations discussed with respect to data structures 400 and FIG. 4 may be repeated any number of times to provide updates to rejection model 301 and keyphrase model 302 via multiple element state score vector 405 and evaluations of single state 311 and a final state or states of the keyphrase models may be similarly repeated to determine if a keyphrase corresponding to any of the keyphrase models has been detected. Furthermore, as is discussed further herein, data structures 400 may support integrated speech/non-speech detection and/or multiple key word models (or sequences).

Figure 5:
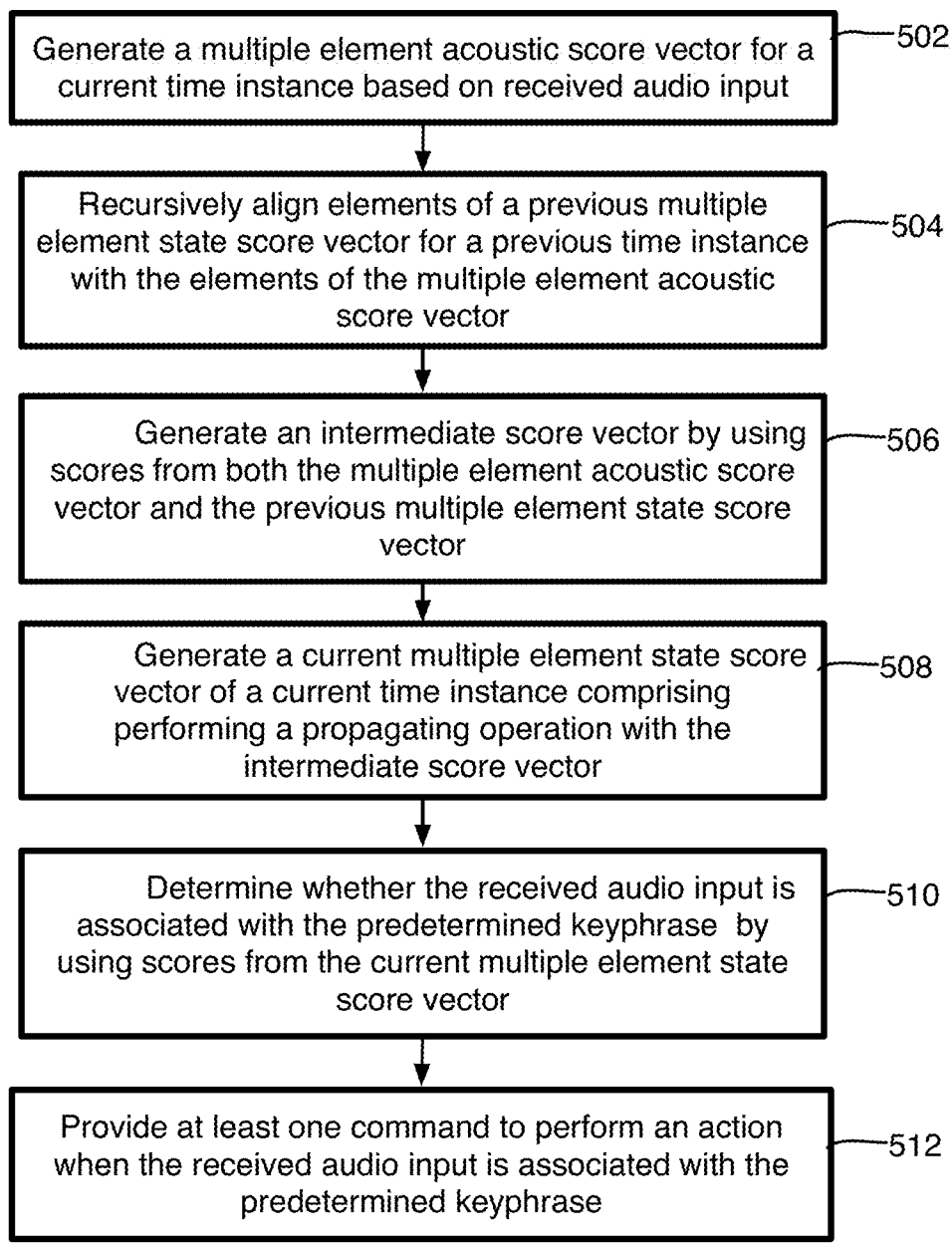
FIG. 5 is a flow chart of a method of neural network keyphrase detection according to at least one of the implementations herein.

Referring now to FIG. 5, a flow diagram illustrating an example process 500 for neural network keyphrase detection is arranged in accordance with at least some implementations of the present disclosure. Process 500 may include one or more operations 502-512 as illustrated in FIG. 5. Process 500 may form at least part of a neural network keyphrase detection process performed, for example, by system 200 or 1600. Furthermore, process 500 will be described herein in reference to systems 200 or 1600 of FIG. 2 or 16 respectively, and where relevant.

It will be understood that many of the operations of process 500 may be performed by a neural network accelerator rather than a DSP or other similar less efficient processor that has specific-purpose hardware to run one or more neural network layers.

Process 500 may include "generate a multiple element acoustic score vector for a current time instance based on received audio input" 502. For example, for a current time instance, an acoustic model such as a deep neural network or the like may be scored to generate the multiple element acoustic score vector such that the multiple element acoustic score vector includes a score for a single state rejection model and scores for one or more multiple state keyphrase models such that each multiple state keyphrase model corresponds to a predetermined keyphrase. The multiple element acoustic score vector may be based on the received audio input and generated using any suitable technique or techniques as discussed further herein.

The process 500 also may include "recursively align elements of a previous multiple element state score vector for a previous time instance with elements of the multiple element acoustic score vector of the current time instance" 504. For example, the multiple element state score vector may be a score vector generated at a previous time instance such that an updated multiple element state score vector is generated or updated over time for continual evaluation for a keyphrase. The multiple element state score vector includes a previous state score for the single state rejection model and previous state scores for the multiple state keyphrase model. The elements, or scores, are aligned with the elements of the multiple element acoustic score vector to perform element-by-element operations that form an intermediate score vector described below. Such use of the previous multiple element state score vector represents a recurrence arc for the individual states on the current multiple element state score vector (as shown on FIG. 6 below). As explained below, this recurrence can be performed on an NNA by using the scores of the previous multiple element state score vector (such as vector 402 of FIG. 4) as bias values to add to the elements of the multiple element acoustic score vector (such as vector 401 (FIG. 4).

The process 500 may include "generate an intermediate score vector by using scores from both the multiple element acoustic score vector and the previous multiple element state score vector" 506. This may be a vectorized operation that may save time, computational resources, and memory resources, and implements the recurrence mention above by applying the previous multiple element state score vector. Thus, the intermediate state score values of such an intermediate score vector may include elements that are an element by element sum of the multiple element acoustic score vector and the previous multiple element state score vector. By one example, the resulting intermediate score vector includes a rejection state value corresponding to a sum of the acoustic score for the single state rejection model and the previous state score for the single state rejection model followed by subsequent keyphrase model values corresponding to sums of acoustic scores for the multiple state keyphrase model and previous state scores for the multiple state keyphrase model.

Figure 6:
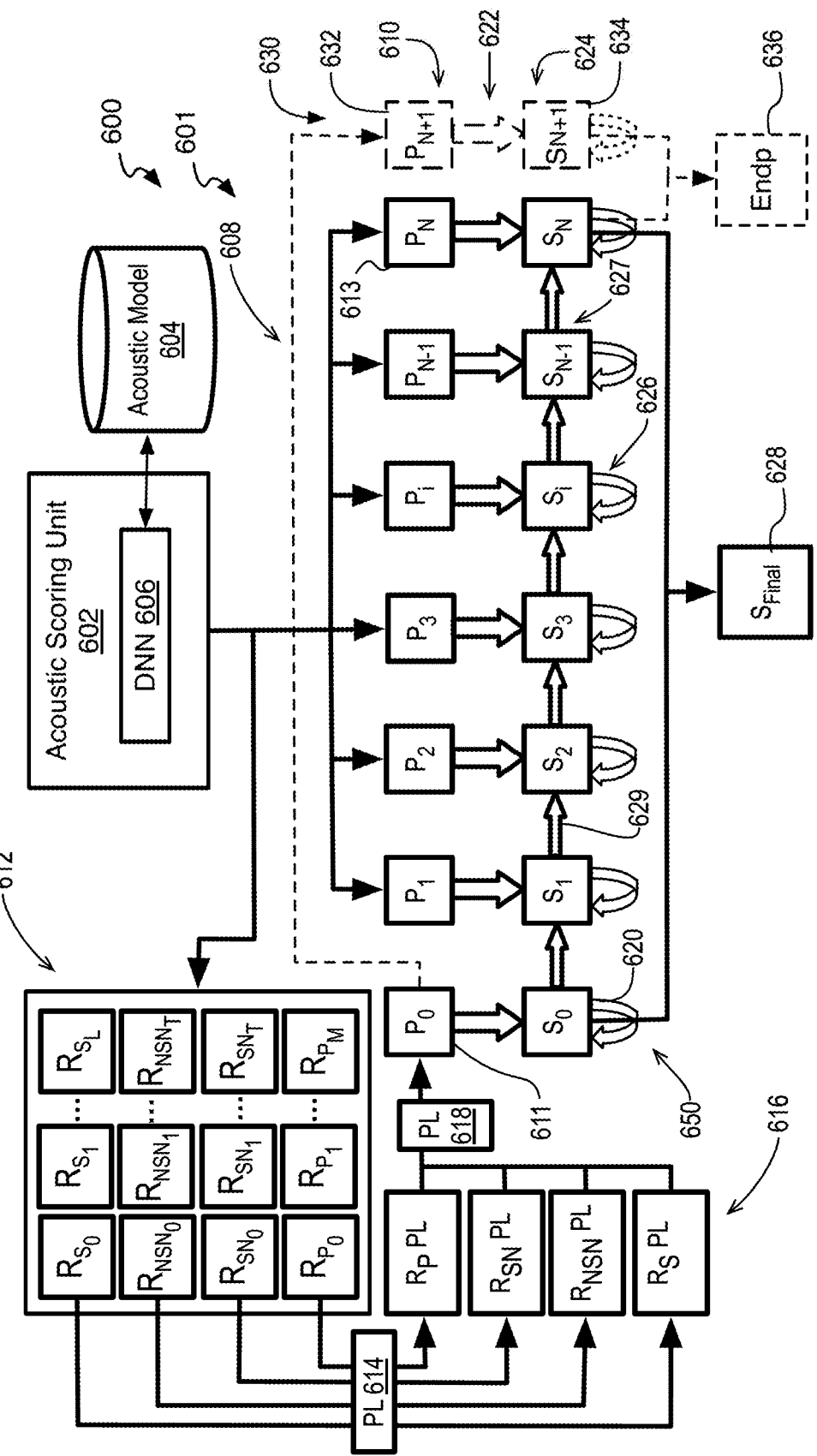
FIG. 6 is a schematic diagram of an example keyphrase decoder with an example data structure according to at least one of the implementations described herein.

Process 500 then may include "generate a current multiple element state score vector of a current time instance comprising performing a propagating operation with the intermediate score vector" 508. By one example, this may involve performing a second vectorized operation to determine a maximum of the rejection state value and a first value of the keyphrase model values and subsequent maxima between the first value of the keyphrase model values and a second value of the keyphrase model values, the second value of the keyphrase model values and a third value of the keyphrase model values, and so on, through a last value of the keyphrase model values to generate a multiple element state score vector for the current time instance. Such processing may provide, for each state of the keyphrase model, a value that is the maximum between a self-loop for the state (for example, the summation value for the state of the keyphrase model) and a transition to the state from a preceding adjacent state of the keyphrase model (for example, the summation value of the state preceding the state of the keyphrase model). This operation may be described as a propagation at the current multiple element state score layer of the scores from $S_1$ to $S_N$ as shown by the arrows 629 from one state to the next on the state score layer 624 (FIG. 6).

Process 500 then may include "determine whether the received audio input is associated with the predetermined keyphrase by using scores from the current multiple element state score vector" 510. Thus, the multiple element state score vector for the current time instance then may be evaluated or analyzed to determine whether a keyphrase has been detected. By one approach, this may involve inputting the scores of the current multiple element state score vector into an affine layer of a neural network, and by one form, of an NNA. Each score may be weighted, and in one form, the rejection score and the last score are given weights –1 and 1 respectively. These may be the only two inputs into the layer. Otherwise, when all scores are input to the affine layer, all of the other scores are given weights of 0 so that the middle scores (between $S_0$ and $S_N$) are dropped. A threshold to be compared to the difference between $S_0$ and $S_N$ also may be input to the affine layer with a weight of –1 by this example. By one form, if the result is positive, the keyphrase has been detected by the NNA. If the result is negative, the keyphrase was not detected by the NNA, or the signs could be reversed when desired. Otherwise, the same combination of $S_0$, $S_N$, and threshold may be used in an equation (recited below as equation (1)), and may be performed by any processor such as a DSP, CPU, or other capable processor. Alternatively, the evaluation may be performed using any suitable technique or techniques such as determining a log likelihood score based on the current state score for the single state rejection model and the final state score for the multiple state keyphrase model and comparing the log likelihood score to a threshold. Other methods are contemplated as well.

If a single keyphrase model is provided, the current state score for the single state rejection model and a final state score for the multiple state keyphrase model may be evaluated to determine whether the received audio input is associated with the predetermined keyphrase corresponding to the multiple state keyphrase model. If multiple keyphrase models are provided, the current state score(s) for the single state rejection model(s) and a maximum final state score of the final state scores for each of the multiple state keyphrase models may be evaluated. A single rejection model common for all multiple keyphrase models may be used or separate rejection models for each keyphrase model may be used. If a keyphrase is detected, a system wake indicator or a system command may be provided to wake the device, execute a device command, or the like.

Also as mentioned above, other alternatives and/or extensions may be used including the use of a dummy state for keyphrase endpoint detection and a recurrent booling process that can be used with the output of the decoder to perform keyphrase start point detection on an NNA rather than a DSP for example. Also, an integrated neural network-based speech/non-speech detection may be performed while the keyphrase detection is being performed. This may involve pooling scores of rejection categories, such as phonetics, speech-noise, non-speech noise, and silence, by one example, into a speech pooled score and a non-speech pooled score that can be used in vectorized operations, the same or similar to those used with the keyphrase-related vectors, to generate at least one final speech score and at least one final non-speech score. These two scores can both be used to determine whether speech exists in the audio input. The pooled speech and non-speech scores can be the same scores to pool together to determine a rejection acoustic score for the rejection model on the multiple element acoustic score vector for keyphrase detection. Other details are provided below.

Process 500 then may include "provide at least one command to perform an action when the received audio input is associated with the predetermined keyphrase" 512. The resulting actions and options are already discussed above with situation 100 (FIG. 1) and system 200 (FIG. 2). As mentioned, when speech/non-speech detection is used, the operations here also may include controlling the buffer size so that when non-speech is detected, a smaller buffer is used and when speech is detected, a larger buffer is used. Further, noise scores from the pooling operation can be used to control microphones of a multiple microphone system (or array) so that microphones can be turned on or off depending on how much noise is being detected. The details of these are also provided below.

Referring to FIG. 6, a keyphrase decoder 600 is arranged with a model-updating data flow (or structure) 601 that can be performed substantially, or entirely, using neural network algorithms and performed by a neural network accelerator. An acoustic scoring unit 602, similar to acoustic scoring unit 203, receives feature vectors from a feature extraction unit 202 as discussed above, and then uses a deep neural network (DNN) 606 based on an acoustic model 604 as described above to generate one or more acoustic scores or outputs that represent audio categories such as (sub-)phonetic keyphrase sounds, rejected phonetic sounds, silence, spoken (speech) noise, non-speech noise, and silence. The acoustic score outputs (scores 214 for example) that are associated with the keyphrase model 302 are properly ordered to $P_1$-$P_N$ to form the keyphrase portion 608 of the scores 613 of a multiple element acoustic score vector 610, which is the same or similar to the acoustic score vector 401 (FIG. 4).

Also as mentioned above, the $P_0$ element of the multiple element acoustic score vector 610 is a current acoustic rejection score 611 of the single state 311 for the single state rejection model 301, similar to score 411 on vector 401. By one form, the acoustic rejection scores are pooled without determining the rejection category of the individual base acoustic scores, and all rejection scores for a time instance may be pooled together, such as by max pooling or other pooling method such as averaging, as explained above with data structure 400. Thus, the separation into different rejection categories is not always necessary for coding of keyphrase detection.

Figure 7:
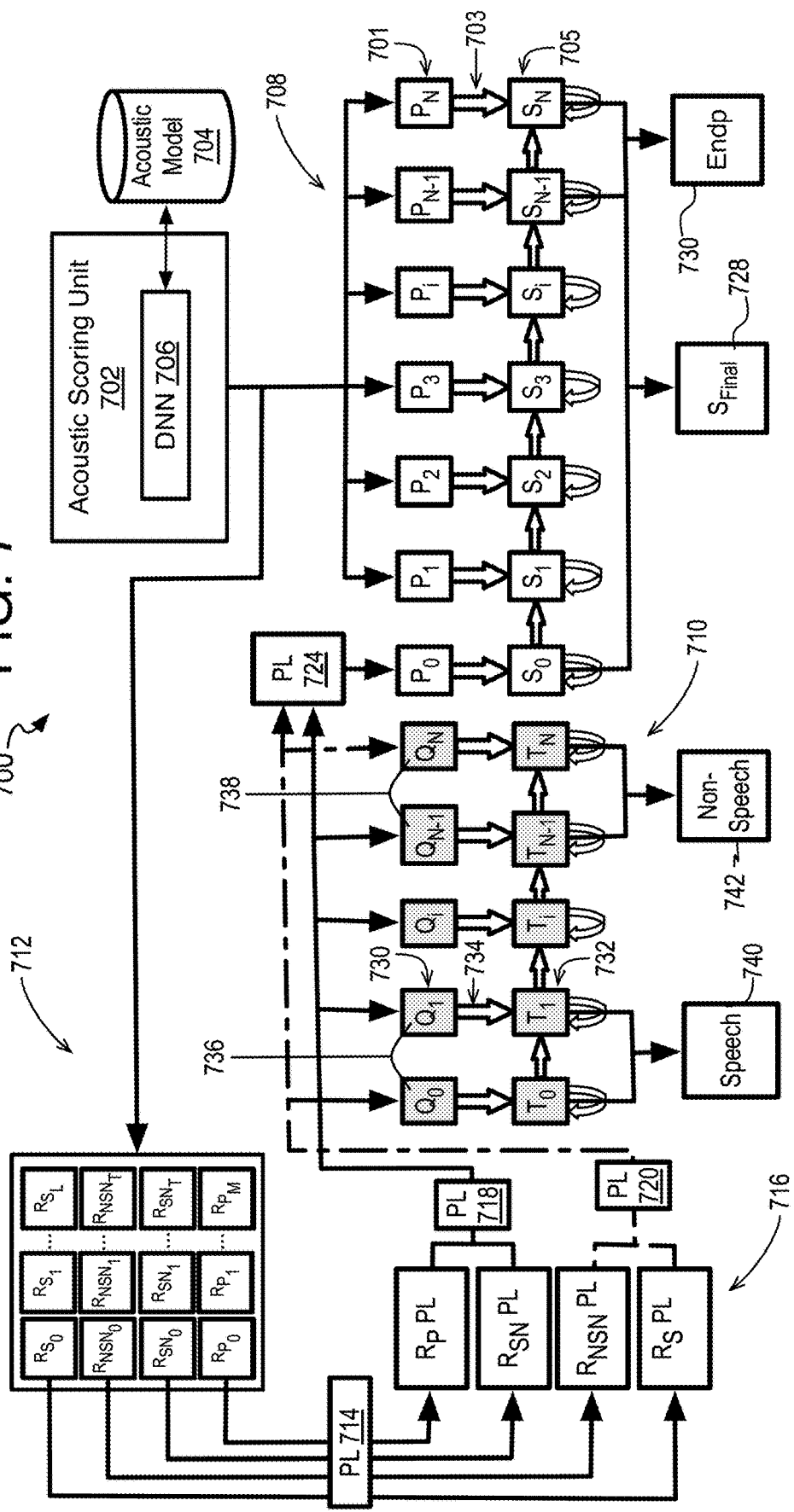
FIG. 7 is a schematic diagram of an example keyphrase decoder with an example speech/non-speech detection data structure according to at least one of the implementations described herein.

By an alternative shown here on decoder 600, however, the different rejection categories are determined, and the base rejection acoustic scores are divided by category. In other words, the decoder 600 may maintain a rejection pooling unit 612 that can group classified base acoustic rejection scores by rejection category. As explained below, this is done in order to perform speech/non-speech detection as described with decoder 700. These classification and pooling operations, however, still may be performed here even though speech/non-speech detection is not being performed with decoder 600. This division of acoustic rejection scores permits the system to maintain the option to perform integrated speech/non-speech detection with the same hardware, such as a neural network accelerator, that can handle either option. The speech/non-speech detection may be provided when such detection is needed as a preliminary keyphrase detection operation, or to be used for other applications. By one example, such a system that provides the speech/non-speech detection option may be particularly useful in higher security systems that provide speaker recognition along with keyphrase detection where implementing text-dependent speaker recognition does not use the speech/non-speech recognition while text-independent speaker recognition does use the speech/non-speech recognition. The full integrated speech/non-speech detection process as well as the reason for dividing the base (or neuron) acoustic rejection scores into categories is explained below with data structure 700 (FIG. 7).

Thus, decoder 600 here provides a rejection pooling unit 612 that divides or re-orders the base acoustic rejection scores (received from the acoustic scoring unit 602 and from the arcs of the single rejection state 311) into different categories to be pooled together depending on the category, and this category-based rejection score pooling may be performed even though speech/non-speech detection is not being provided.

By one approach, each time instance provides four acoustic rejection scores (also referred to as rejection base acoustic scores or rejection neurons), and the base acoustic scores are divided into separate categories to be pooled, and shown here in separate pooling rows with one row each for silence ($R_S$), non-spoken noise ($R_{NSN}$), spoken noise ($R_{SN}$), and rejected phonetic entries ($R_P$). The rejection pooling unit 612, or the acoustic scoring unit, is able to categorize the acoustic rejection scores in the first place by using known methods that analyze the shapes of the signals for example.

Each row in the rejection pooling unit 612 is formed by assigning multiple acoustic rejection scores from the current time instance to the correct row by category to form multiple scores in each category row including $R_{S0} \ldots R_{SL}$ for silence, $R_{NSN0} \ldots R_{NSNT}$ for non-spoken noise, $R_{SN0} \ldots R_{SNT}$ for spoken-noise, and $R_{P0} \ldots R_{PM}$ for rejected phonetics. By one form, max-pooling is performed on each row to obtain one maximum acoustic rejection score ($R_P$PL, $R_{NSN}$PL, $R_{SN}$PL, and $R_S$PL) 616 for each category, but other pooling techniques could be used instead such as averaging or other operations. The category pooling of base acoustic scores into one category pooled score 616 for each category may be performed by a first pooling unit 614, and thereafter, the four pooled category scores 616 all may be pooled together by a second pooling unit 618 to form a single pooled acoustic rejection score $P_o$ 611. Multiple element acoustic score vector 610 with acoustic scores $P_0$-$P_N$ then spans a linear neural network layer with elements with weight w=1 and bias b=0 that places the phonetic DNN scores from the acoustic scoring unit 602 in the correct order in the acoustic score vector 610 so that the acoustic score vector 610 represents the keyphrase outputs in the correct order. The elements of the acoustic score vector 610 then can be used to propagate its values by operations 622 and to a recurrent layer 650 by a linear activation function y=wx+b, although other arrangements could be used if desired.

Next, neural network recurrent layer 650 is established or operated. The operations of the recurrent neural network layer 650 are the same or similar to those vectorized operations performed by using data structure 400 (FIG. 4). Particularly, the vectorized operations of data structure 400 are represented by the recurrent layer 650, and can be operated by a NNA. The layer 650 includes or forms a current multiple element state score vector 624 that has state scores $S_0$ to SN (627) that corresponds to acoustic scores from the keyphrase model 302 and a single rejection state score 620 that corresponds to the rejection model 301. The operation arrows 622 represent the element-by-element operations of the data structure 600 that is the same or similar as in data structure 400 (FIG. 4). Likewise, the recurrent arrows 626 represent use of the current state scores in the current multiple element state score vector 624 as previous scores to form a previous multiple element state score vector to be summed, or otherwise combined, with the multiple element acoustic score vector 610 in a recurrent manner to form an intermediate score vector (or summation vector), and as explained with vectors 401 and 402, and shown as vector 404 on data structure 400. Finally, the transition arrows 629 from state to state on the multiple element state score vector 624 represent a propagation operation, and by one form, may be performed by pooling, which may be max pooling, of adjacent pairs of intermediate scores of the intermediate score vector, also as with the pooling operations 406 of data structure 400.

The data structure 600 includes these neural network structures of the recurrent layer 626 so that an NNA can perform the keyphrase detection without the use of a DSP that is more inefficient with NN computations. One example is that to implement the recurrence by forming and using a previous multiple element state score vector, the elements (or scores) on the current multiple element state score vector may be treated as bias values, such as with the linear activation function for a neural network mentioned above, so that an NNA can add the bias values to the separate elements of the multiple element acoustic score vector. Other details are explained below.

Once the current multiple element state score vector 624 is generated, the elements on the vector may be used in a final decision as to whether or not a keyphrase is present in the audio input being analyzed. By one form, as mentioned, the element $S_0$ representing the rejection model and one of the elements representing the keyphrase model, such as the last score $S_N$ may be used to determine a final score $S_{Final}$ as already described above for data structure 400. Alternatively, for the state scores forming the recurrent layer 650 and current multiple element state score vector 624 here, the decoder 600 may use an equation that compares the difference between the rejection score and last score to a threshold to obtain the final score $S_{Final}$ 628 as follows:

$$S_{Final}=(S_0*(-1)S_N*1)-\text{thr} \qquad (2)$$

where thr is a threshold value which may be determined by heuristics, and by one form, to set the thresholds for specific needs or applications. When the result is positive, the keyphrase exists, but when the result is negative, no keyphrase exists in the audio input. By subtracting $S_0$ from $S_N$ and ignoring the middle scores $S_1$ to $S_{N-1}$, the middle scores are place holders to be used for propagation through an S-array. Thus, the last state S_N–the reject state S_0 is then literally the score that would be reached when the keyphrase is spoken minus the sound in front of the keyphrase.

While the equation may be performed by a DSP or other such processor, the NNA may perform this operation instead by treating the final determination as an affine neural network layer (fully connected layer) with a single node (single element layer). This affine layer operates with a linear activation function and uses the weights to assign a desired sign to the variables in the equation (1) such as a −1 to the rejection element $S_0$, and +1 to the keyphrase element $S_N$. By one option, the threshold thr is also treated as an input to the affine layer and is given a weight of −1 as well. This affine layer arrangement only has these three inputs ($S_0$, $S_N$, and thr). The middle scores, however, can also be used as inputs to form a fully connected layer where the middle scores $S_1$ to $S_{N-1}$ of the current multiple element state score vector 624 drop out by providing each of these middle scores a weight of zero. Once it is determined whether a keyphrase does or does not exist in the audio input, an indicator of the decision is provided to other applications as described above. It will be appreciated that the signs could be reversed if desired as well (so that a negative final score value indicates a keyphrase is present).

By yet other alternatives, a dummy state 630 is provided to perform on-the-fly end of keyphrase end detection. The dummy state 630 may be represented by, or formed by, providing an acoustic score $P_{N+1}$ 632 and state score $S_{N+1}$ 634 respectively forming ends of vectors 610 and 624. Specifically, $P_o$ is copied to $P_{N+1}$ 623 and the additional state $S_{N+1}$ 634 models arbitrary speech, noise, or silence after the keyphrase. The output of the state $S_{N+1}$ 634 is provided to an additional affine endpoint layer (Endp) 636. Endpoint layer 636 may receive two inputs: an output score of SN with a weight of 1 and an output score of $S_{N+1}$ with a weight of −1. The endpoint of the keyphrase is considered detected when the output of Endp 636 turns negative (or positive when signs are reversed). It also will be understood that a threshold may or may not be an additional input with the appropriate weight of −1 or 1 when a comparison to a threshold is desired.

Referring to FIG. 7, a keyphrase decoder 700 is provided where the keyphrase detection (and keyphrase endpoint detection when desired but not shown) are the same or similar to that already described on decoder 600 such that the description need not be repeated here. Keyphrase decoder 700 here, however, also is arranged to detect speech and non-speech on-the-fly or in parallel with keyphrase detection and by using a neural network accelerator instead of a DSP as well. In this case, pooled non-speech noise scores and silence scores may be used to track non-speech, while pooled spoken noise and rejected phonetic scores are used to detect speech. Specifically, an acoustic rejection pooling unit 712 may be provided and re-orders acoustic rejection scores into categories and pools the acoustic rejection scores by category as already described above with rejection pooling unit 612 (FIG. 6). For instance, a pooling unit 714 separately pools each row of each category of acoustic rejection scores into one category pooled score for each category ($R_P$PL, $R_{NSN}$PL, $R_{SN}$PL, and $R_S$PL) 716. As mentioned above, max pooling is used but other techniques may be used instead such as average pooling or other operations.

Different than decoder 600, however, decoder 700 then pools the acoustic category pooled scores by speech versus non-speech. Thus, the category pooled scores 716 for rejected phonetics $R_P$PL and spoken noise $R_{SN}$PL are pooled together to form a pooled speech score $I_0$ by a pooling unit 718, while the category pooled scores 716 of silence $R_S$PL and non-spoken noise $R_{NSN}$PL are pooled together by a pooling unit 720 to form a pooled non-speech score $I_1$. By one alternative, the speech and non-speech scores $I_0$ and $I_1$ are pooled together to form the acoustic rejection score $P_0$ to be used for keyphrase detection in addition to being used for speech/non-speech detection.

For speech/non-speech detection, the outputs (or pooled speech score and pooled non-speech score) are provided to a speech/non-speech detection neural network data structure or unit 710. Specifically the outputs are re-ordered to form a neural network acoustic rejection score layer Q 730 with scores $Q_0$ to $Q_N$, which are then propagated to a recursive neural network layer T (or current multiple element rejection state score layer) 732. This is performed by operations 734 and of the recurrent layer T 732 that operate the same as with the keyphrase detection layers 701 and 705 (or 610 and 624). Thus, these operations include an element by element summation (or other combination) of the elements of the acoustic rejection score layer Q 730 with the recursive elements of a previous multiple element rejection state score layer 732 and a propagation operation to form a current multiple element rejection state score layer 732. This permits decoder 700 to combine recursive layer S 705 with recursive layer T 732 in one large recursive layer for input to a neural network at once except with no transitions between the recursive layer S 705 and recursive layer T 732 (e.g. by no transition between elements $T_N$ and $S_0$) by modeling the two separate recursive layers separately.

The acoustic rejection score layer Q 730 is arranged so that the pooled non-speech score $I_1$ is positioned at the ends of the layer Q at score positions $Q_0$ and $Q_N$, while the pooled speech score $I_0$ is placed at all of the intermediate score positions $Q_1$ to $Q_{N-1}$. This forms two transition locations: a first transition location 736 where non-speech transitions to speech can be detected, and a second transition location 738 where speech transitions to non-speech can be detected. At the multiple element rejection state score layer 732, this tracks the transitions from non-speech to speech ($T_0$ to $T_1$) and from speech to non-speech ($T_{N-1}$ to $T_N$) with a similar approach as that provided by the endpoint detection. Thus, to make a final determination at a current time instance, the rejection unit 710 may operate the final speech or non-speech determination as an affine layer where the two scores ($T_0$ to $T_1$) or ($T_{N-1}$ to $T_N$) are two inputs to the affine layer with one having a weight or 1 and the other with a weight or −1, and simply then determining whether one of the final speech or non-speech scores 740 or 742 is positive (or negative). In this case, a threshold may or may not be an additional input with the appropriate weight of −1 or 1. Other ways to make this determination could be determining the difference between scores $T_0$ and $T_1$ from a final Speech score that can be compared to a threshold, while the difference between $T_{N-1}$ and $T_N$ from a final non-speech score may be compared to a threshold. Once a threshold is reached, the speech or non-speech has been detected. Other methods for making the final speech and/or non-speech determination could be used as well. It also will be understood that while the layers Q and T are shown with five states, many other numbers of states could be used so that large speech durations can still be modeled on a single vector and with a desirable certain target speech length.

Turning to the issue of multiple keyphrase detection, and as discussed herein and as shown in FIG. 3, in some implementations, a single keyphrase model 302 may be implemented (e.g., for a single keyphrase). In other implementations, multiple keyphrase models (e.g., each associated with a different keyphrase or a variation of the same keyphrase or both) may be implemented. For example, each of multiple keyphrase models may be subsequent to rejection model 301 and connected to rejection model 301 by a transition in analogy to keyphrase model 302 being connected to rejection model 301 by transition 313. In some implementations, each of multiple keyphrase models may be associated with a separate instance of rejection model 301. Furthermore, as discussed with respect to keyphrase model 302, each of the multiple keyphrase models may include multiple states (or nodes) interconnected by transitions and each of the states may include or be updated by one or more self loop such that the states may be updated based on a transition from a prior state in the keyphrase model (or the transition from rejection model 301). As discussed, each self loop may be associated with an output (e.g., an acoustic score) from acoustic scoring module 203.

Figure 8:
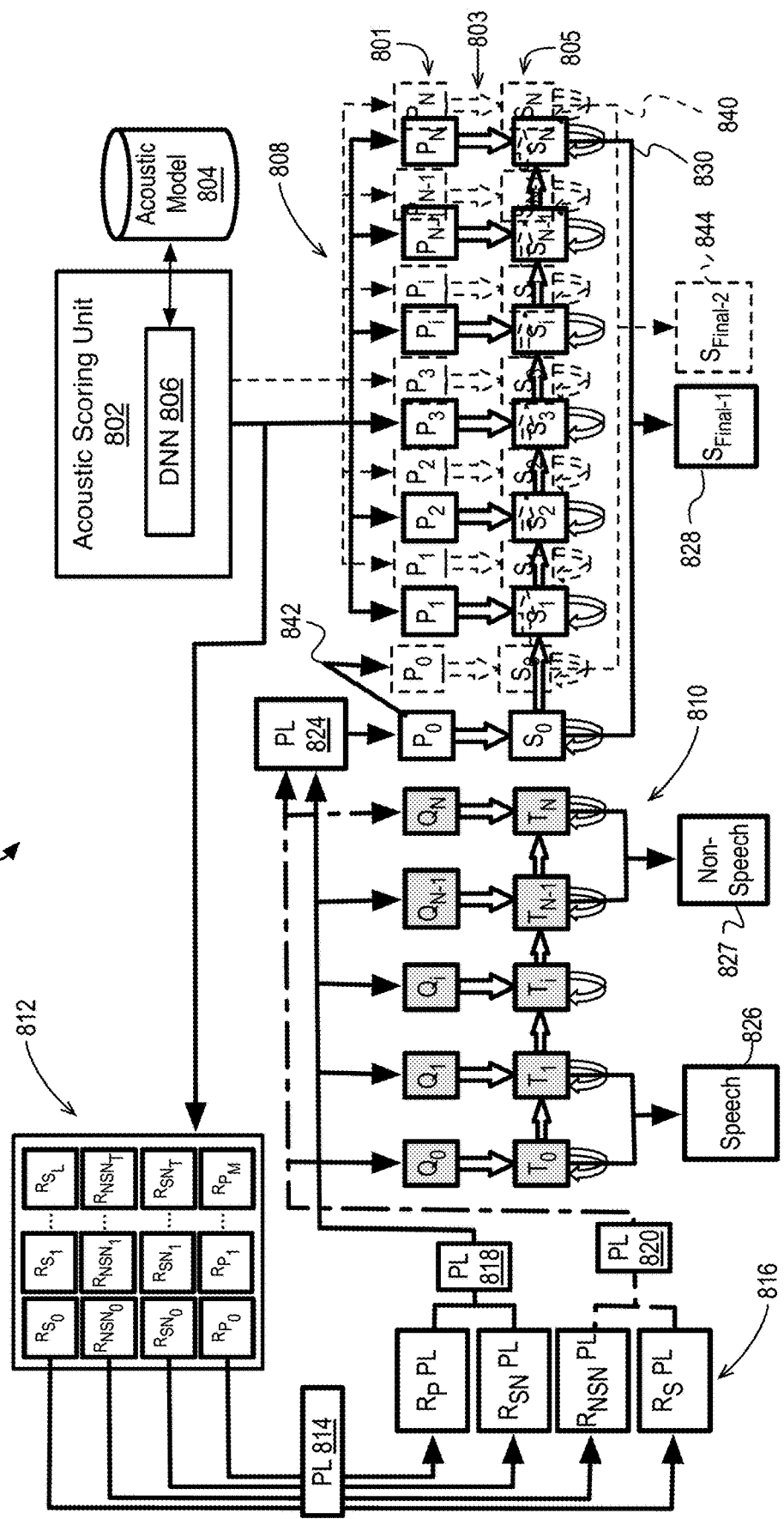
FIG. 8 is a schematic diagram of an example keyphrase decoder with an example data structure for multiple keyphrase detection according to at least one of the implementations described herein.

Referring to FIG. 8, a keyphrase decoder 800 with integrated speech/non-speech detection, similar to that of decoder 700, is shown to implement multiple keyphrase detection as discussed with decoder 300. Decoder 800 is arranged to decode two keyphrases where a neural network keyphrase structure or unit 808 operates similar to those on decoder 600 or 700, except here each keyphrase has a separate descriptor (or structure layer) where one descriptor 830 is shown in solid line, and the other descriptor 840 is shown in dashed line, resulting in an independent final score for each descriptor. Each keyphrase here has a parallel descriptor so that any number of keyphrases can be used and is not limited to two. For decoder 800 where the keyphrases have parallel descriptors, each of the descriptors shares the same rejection acoustic score $P_0$ 842, and can be associated with the same speech/non-speech detection structure results. However, it will be noted that no state score transition is provided from the last state score of one descriptor (for one keyphrase) to the first state score of another descriptor (of a different keyphrase) to maintain the separation and independence of the analysis for an individual keyphrase, and by one form, all of the keyphrases. The final threshold decision may be implemented as an affine layer for each of the descriptors with either only the two $S_0$ and $S_N$ values as inputs, or the whole recursive net being input with the middle sores of each descriptor having 0 weights. This provides an independent final score 828 and 844 for each descriptor. Such multiple keyphrase detection is analyzed by an NNA by inputting one descriptor at a time into the NNA local inputs by toggling between the descriptors and calculating one descriptor and then the other.

Figure 9:
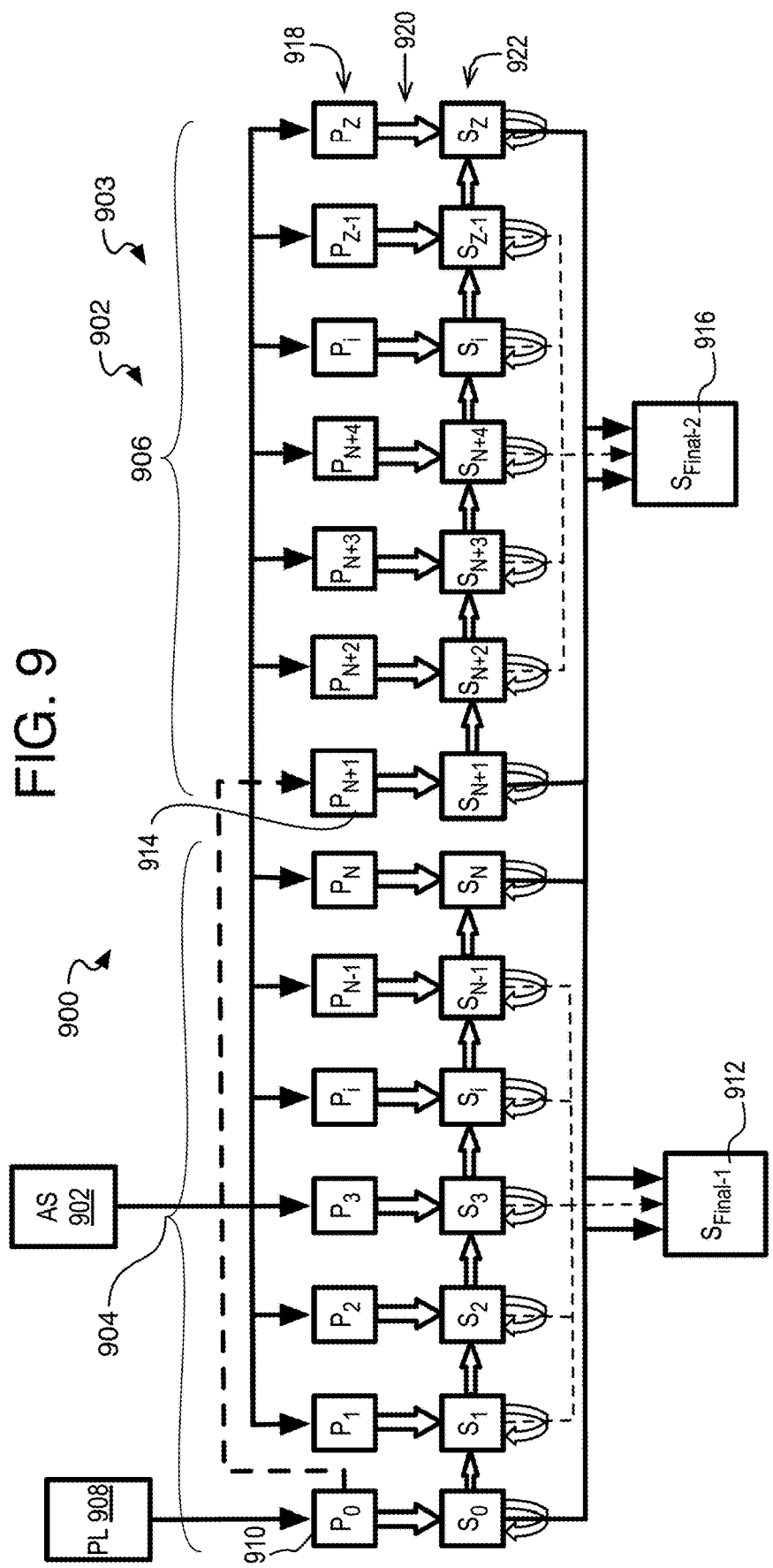
FIG. 9 is a schematic diagram of an example keyphrase decoder with another example data structure for multiple keyphrase detection according to at least one of the implementations described herein.

Referring to FIG. 9 as another alternative, a keyphrase decoder 900 shows a neural network keyphrase detection data structure or unit 902 with layers 918 and 922, and operations 920 to detect multiple keyphrases, and with neural network operations already described above for decoders 600, 700, or 800. Here, multiple individual keyphrases each with a keyphrase sequence 904 or 906 are detected by concatenating the keyphrase sequences 904 and 906 (or more sequences) into a single descriptor 903. Thus, recurrent layer 922 has keyphrase sequence 904 shown with states $S_0$ to $S_N$, while keyphrase sequence 906 is shown with states $S_{N+1}$ to $S_Z$. Each keyphrase sequence still shares the same acoustic rejection score $P_0$ 910 which becomes acoustic score $P_{N+1}$ 914 obtained from a rejection pooling unit 918 similar to those pooling units described above. Also as stated for decoder 800 with multiple parallel keyphrase sequences in a descriptor, the keyphrase sequences 904 and 906 here are kept separate in the same way by avoiding state score transitions from one keyphrase sequence to another keyphrase sequence. Thus, no transition exists from $S_N$ to $S_{N+1}$. Therefore, each keyphrase sequence 904 or 906 may determine a final score $S_{Final-1}$ 912 and $S_{Final-2}$ 916 based on its own start and end states ($S_0$ and $S_N$ state scores for sequence 904, and scores $S_{N+1}$ and $S_Z$ for sequence 906) being input to an affine layer, and with middle scores for each sequence in the descriptor having weights of 0 when all scores are input to the affine layer for a single descriptor. The catenation of keyphrase sequences in a single descriptor is different than the parallel treatment of descriptors because in this case at least one descriptor has multiple keyphrase sequences that may be input to the inputs of the NNA together as a single large vector. The separation of the transition from one sequence to the other sequence can carry through the NNA algorithms to provide separate final scores.

Figure 10:
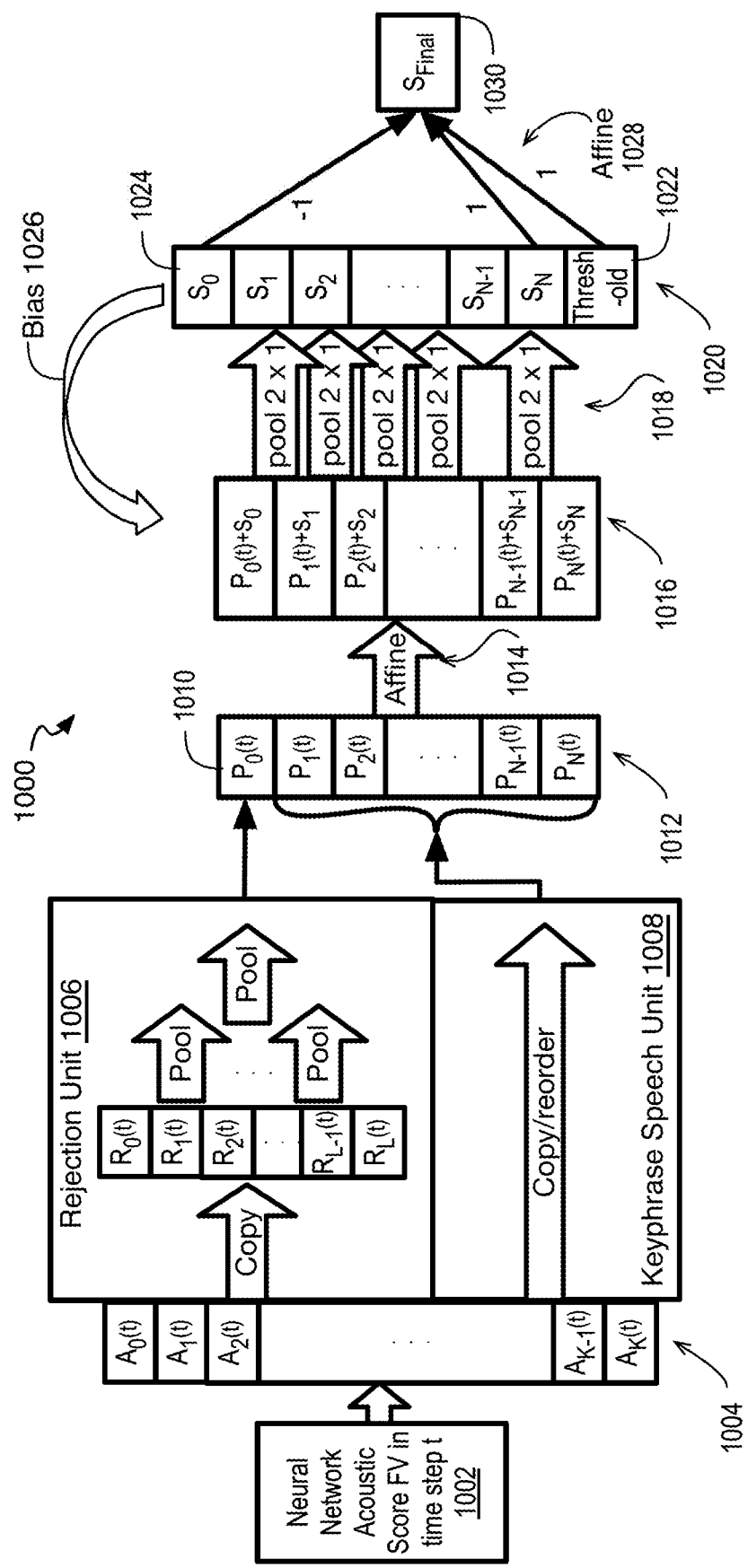
FIG. 10 is a schematic diagram showing an example neural network accelerator with an example data flow arrangement according to at least one of the implementations described herein.

Referring to FIG. 10, a hardware neural network accelerator (NNA) 1000 may implement the keyphrase decoders described above. The NNA 1000 may implement only a few basic functions: addition of vectors, vector-vector multiplication, dot product, maximum value, and neuron activation to perform the keyphrase detection, speech/non-speech detection, and other tasks described herein. Such neural network processing structures such as an NNA can significantly reduce processing time and power consumption to calculate final results.

The NNA 1000 may receive input from a neural network acoustic score feature vector (FV) time step t 1002 and place the input data in a buffer. The input data for the keyphrase decoding is shown here as a vector 1004 of acoustic scores $A_i(t)$ (where i=0 . . . K) that represents outputs from an acoustic scoring unit DNN network. Since the scores $A_i(t)$ are not necessarily in the correct order of the keyphrase for the acoustic score vector 1012 and the rejection unit does not know which scores are rejection scores. Thus, the system can use the NNA to copy rejection scores to a rejection unit (or rejection pooling unit) 1006 by mapping acoustic scores $A_i(t)$ to rejection scores $R_i(t)$ by using 0 and 1 values, or in other words, by using an affine layer with weights of 0 to drop a non-rejection score or 1 to keep a rejection score. The acoustic rejection score $P_0(t)$ value that represents the rejection model is generated as the maximum (or other pooled value) of the set of rejection category base score outputs (silence ($R_S$), non-speech noise ($R_{NSN}$), spoken noise ($R_{SN}$), and rejected phonetic entries for rejection ($R_P$) as described above). This process can be performed on an NNA using layers with MAX POOL functions for example, and the resulting $P_0(t)$ score 1010 is placed in an acoustic layer (or posterior layer) vector $P_i$ 1012

Values of nodes that represent the keyphrase are copied and re-ordered to vector $P_1$-$P_N$ (referred to as vector $P_i$ 1012) with use of a linear affine layer of a keyphrase speech unit 1008 and by mapping acoustic scores $A_i(t)$ to keyphrase acoustic scores $P_i(t)$ by using 0 and 1 values, as explained above for the rejection scores, except here a weight 1 is given to keyphrase speech scores to be kept and a weight 0 is given to non-keyphrase scores to be dropped.

An affine layer 1014 is then uses vector $S_i$ 1020 as a bias layer (BIAS 1026) that is added to vector $P_i$ 1012 shown by summation unit 1016. The initial values of $S_i$ vector 1020 are zero. By one approach, a threshold for keyphrase detection may be added as an extra input 1022 and is held constant throughout the computations (although a varying threshold could be used instead). This recurrent operation is performed as addition of BIAS 1026 by operating an AFFINE (AFFINE DIAGONAL) layer where a weight matrix may be a 1-D matrix with one element per row of the matrix. The score propagation is than realized as MAX POOL 2×1 function 1018 executed on a vector 1016 being a sum of $P_i$ and $S_i$:

$$\{MAX\,POOL(P_{N-1}(t)+S_{N-1}(t),\,P_N(t)+S_N(t)), \quad (3)$$
$$MAX\,POOL(P_{N-2}(t)+S_{N-2}(t),\,P_{N-1}(t)+S_{N-1}(t)),$$
$$\ldots$$
$$MAX\,POOL(P_1(t)+S_1(t),\,P_2(t)+S_2(t)),$$
$$MAX\,POOL(P_0(t)+S_0(t),\,P_1(t)+S_1(t)),$$
$$P_0(t)+S_0(t)\}$$

It should be noted that by one form, the MAX POOL is first applied at the end of the $S_i$ vector 1020 (not including the threshold element 1022) and is computed overlapping pair of elements pair by pair in reverse of the element numbering in $S_i$ vector unit 1020 until $S_1$ operations are reached. A final score then may be calculated according to the formula:

$$S_{FINAL}=S_0*(-1)S_N*(1)\text{Threshold}*(-1) \quad (4)$$

with use of an AFFINE layer 1028 in which weights for nodes $S_1$-$S_N$ are set to 0, as with equation (2) mentioned above. A positive value of $S_{FINAL}$ 1030 node indicates a keyphrase was detected. Of course, the signs may be switched when a negative outcome is desired.

Figure 16:
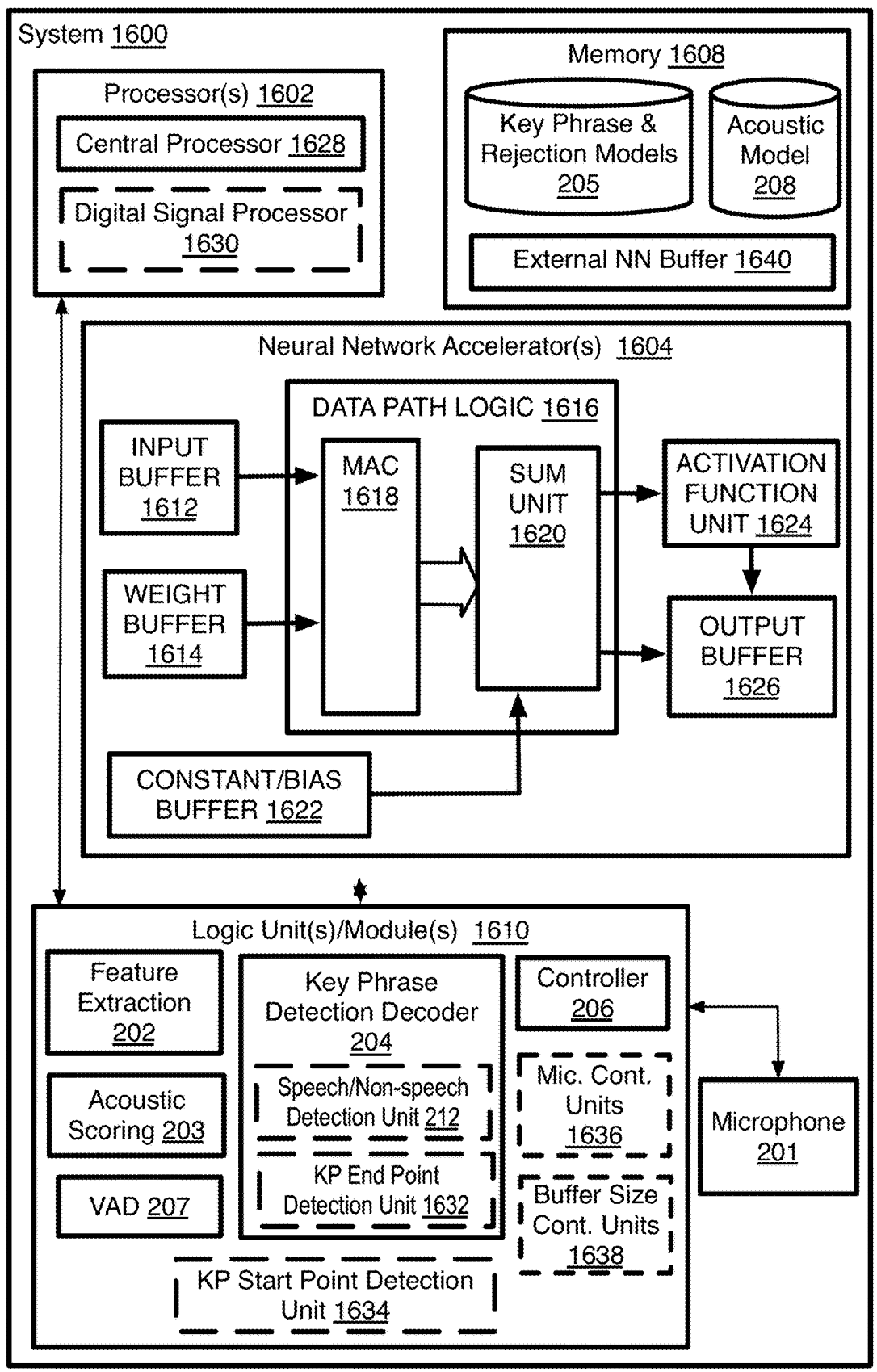
FIG. 16 is an illustrative diagram of an example audio processing system for performing keyphrase detection.

The NNA 1000, as with any NNA mentioned herein, may have local buffers for each type of input including the input data buffer (the scores), a weight buffer, and a bias buffer. These components among other are provided on system 1600 (FIG. 16).

For multi-keyphrase support, the posterior layer $P_i$ 1012 and the bias-vector $S_i$ 1020 may be modified by vector extension by decoders 900 (FIG. 9) or by separate layer descriptors as with decoders 800 (FIG. 8). Scoring of multi-keyphrases then stays the same as described above with single keyphrase detection except now with larger layers and no score-transition between adjacent state scores via pooling in an S-array when the adjacent state scores are from different keyphrase-descriptors as described above with decoders 800 and 900.

Figure 11:
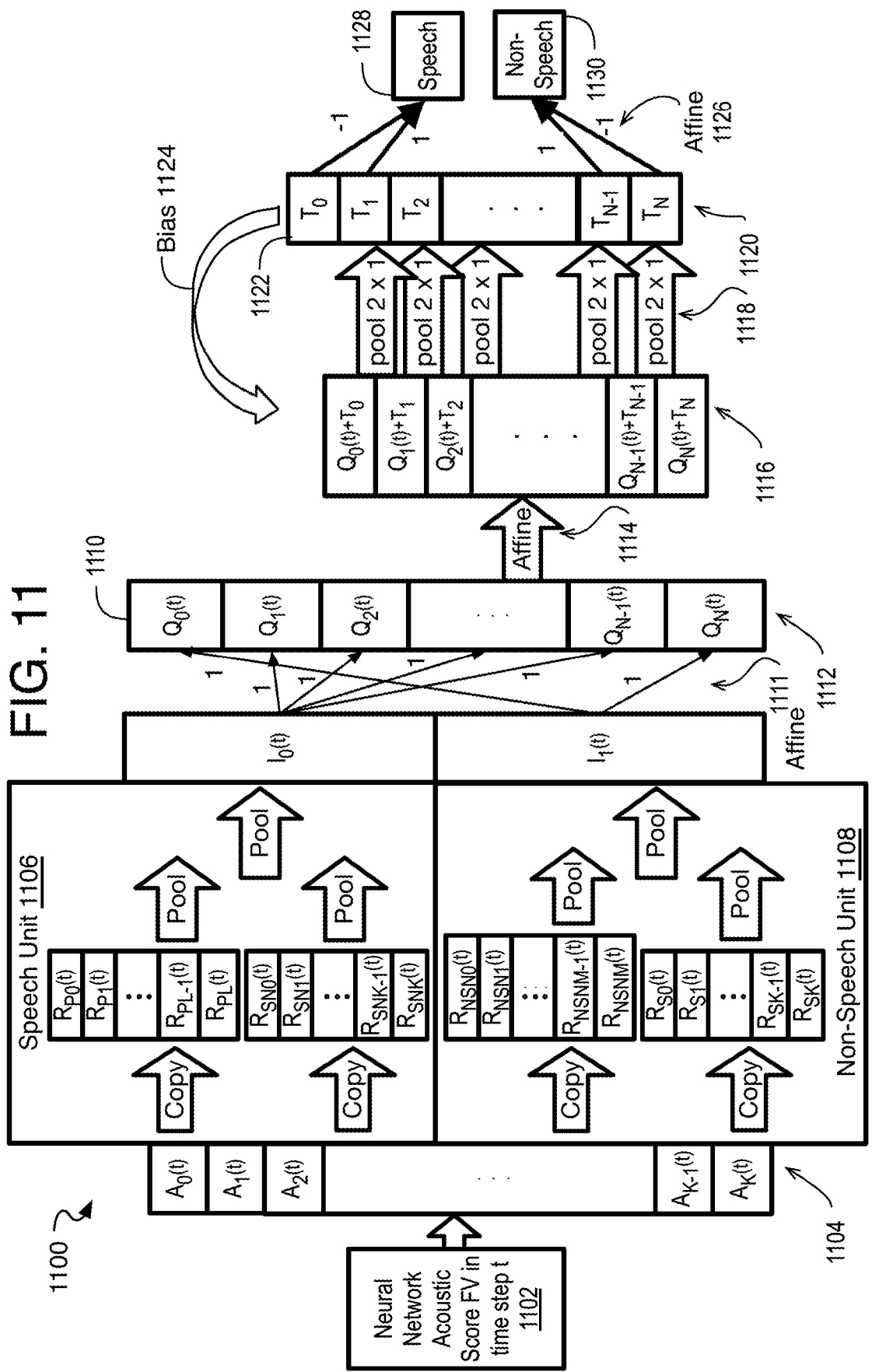
FIG. 11 is a schematic diagram showing another example neural network accelerator with an example data flow arrangement according to at least one of the implementations described herein.

Referring to FIG. 11, a neural network accelerator (NNA) 1100 is provided to implement the speech/non-speech detection described above. The input data to the NNA 1100, acting as a speech/non-speech classifier, is an acoustic score vector $A_i(t)$ (i=0 . . . K) 1104 that represents acoustic score outputs from a neural network acoustic score feature vector (FV) unit 1102 providing input at time steps t. The classifying of the acoustic rejection scores is as described above. A speech unit (or speech rejection pooling unit) 1106 copies rejected speech-related scores from the vector A 1104 and maps the rejection acoustic scores by category so that speech-related acoustic scores $A_i(t)$ are mapped to either speech noise scores ($R_{SN0}(t)$ to $R_{SNK}(t)$) or rejected phonetic units ($R_{P0}(t)$ to $R_{PL}(t)$), while the non-speech unit 1108 maps the non-speech related rejection acoustic scores Mt) to either non-speech noise scores ($R_{NSN0}(t)$ to $R_{NSNM}(t)$) or silence ($R_{S0}(t)_{to}$ $R_{SK}(t)$) by using 0 and is as described above. These base acoustic rejection scores are then pooled, such as max pooled or other operation, to form a category score for each category and then a single pooled speech score $I_0(t)$ and single pooled non-speech score $I_1(t)$ as described above.

The next neural network operations then can be performed similarly by the NNA by using neural network layers with MAX POOL functions. For example, the speech pooled score $I_0$ value is then propagated to nodes $Q_1$-$Q_{N-1}$ of vector $Q_i$ 1110, whereas the non-speech pooled score $I_1$ value is propagated to nodes $Q_0$ and $Q_N$ of that same vector $Q_i$. This propagation to reorder the scores $I_0$ and $I_1$ into the Q layer 1112 can be performed using an AFFINE layer 1111 where the weights are all 1. Vectorized Neural network operations then proceed to use the scores $Q_0$ to $Q_N$ in vector Q 1110 to form a multiple element rejection state score vector $T_i$ 1120 that includes rejection state scores ($T_0$ to $T_N$) 1122. This is performed by first using an affine layer 1114 to combine vectors Q 1112 and 1120 to form an intermediate rejection score vector 1116 such the NNA proceeds just as described above for keyphrase detection. Thus, multiple element state score vector $T_i$ is added to vector $Q_i$ by addition of BIAS 1124 by performing the AFFINE (AFFINE DIAGONAL) layer 1114.

The score propagation is than realized as a MAX POOL 2×1 function 1118 executed on an intermediate score vector 1116 with the sum (or other combination) of $Q_i$ and $T_i$:

$$\{MAX\ POOL(Q_{M-1}(t)+T_{M-1}(t), Q_M(t)+T_M(t)), \quad (5)$$
$$MAX\ POOL(Q_{M-2}(t)+T_{M-2}(t), Q_{M-1}(t)+T_{M-1}(t)),$$
$$...$$
$$MAX\ POOL(Q_1(t)+T_1(t), Q_2(t)+T_2(t)),$$
$$MAX\ POOL(Q_0(t)+T_0(t), Q_1(t)+T_1(t)),$$
$$Q_0(t)+T_0(t)\}$$

thereby forming a current vector T 1120 with rejection state scores $T_0$ to $T_N$. The same reverse operation order for MAX POOL with P and S vectors 1012 and 1020 for the keyphrase elements applies here as well.

The final results include a final SPEECH score (or node) 1128 as a transition from "no speech" to "speech", and a final NO SPEECH score or node 1130 as a transition from "speech" to "no speech". These final scores are calculated according to equations:

$$SPEECH=T_0*(-1)+T_1*(1), \quad (6)$$

$$NO\ SPEECH=T_N*(-1)+T_{N-1}*(1) \quad (7)$$

These equations (6) and (7) may be implemented by using an AFFINE layer 1126 either inputting only these values into the affine layer 1126 and where $T_0$ and $T_N$ are each given a weight of −1, while $T_1$ and $T_{N-1}$ are each given a weight of 1. Otherwise, the NNA can input all T scores 1122 in which weights for middle nodes $T_2$-$T_{N-2}$ are set to 0. A positive value of a SPEECH node 1128 indicates speech is detected, while a positive value of NO SPEECH node 1130 indicates no speech (silence) or vice-versa.

Figure 12:
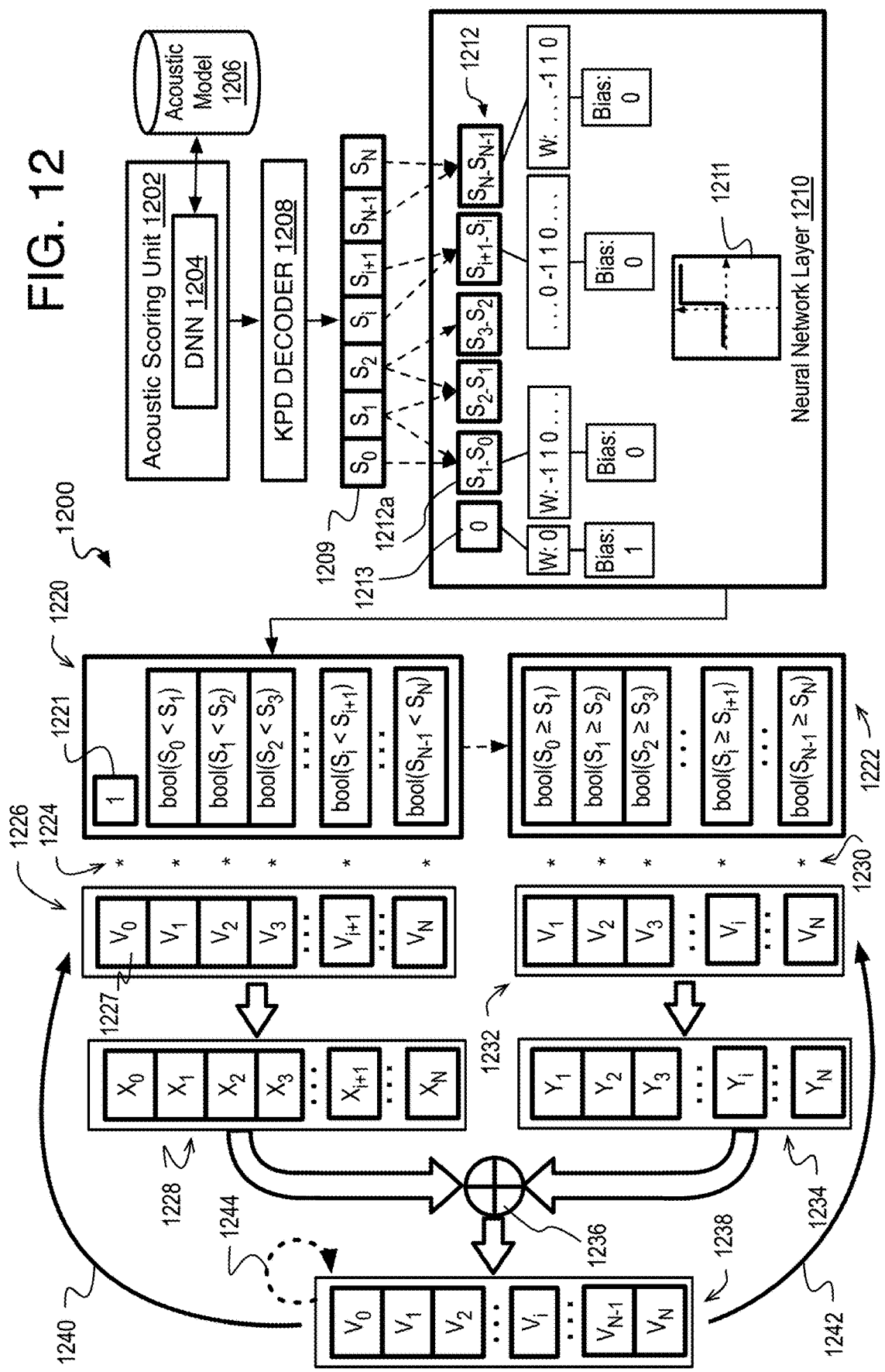
FIG. 12 is a schematic diagram showing a keyphrase start point detector with an example data flow arrangement according to at least one of the implementations described herein.

Referring now to FIG. 12, a NNA keyphrase start point detection unit 1200 is provided to implement keyphrase start point detection. This is accomplished by using a number of bool operations in a recurrent manner after receiving keyphrase scores from a keyphrase decoder as described above. Specifically, an acoustic scoring unit 1202 may use a DNN 1204 with an acoustic model 1206 to provide acoustic scores to a keyphrase detection decoder unit 1208 as described herein. Thus, the input for the start point detection unit or processes 1200 provided by the NNA here are keyphrase scores vectors $S_i$ (i=0, . . . , N) (or just keyphrase vector) 1209 for a single keyphrase model produced by KPD (or WoV) decoder 1208. These vectors 1209 may be the scores of the current multiple element state score vector as described above.

Thereafter, the keyphrase start point detection processing takes place in three main stages. In the first stage, a bool vector 1220 and an inverse bool vector 1222 are generated for an inputted keyphrase state score vector 1209. This stage has a neural network unit 1210 that applies certain weights and biases to the keyphrase vector 1209 for a single neural network layer, differences (or combines) adjacent elements $S_n$ of $S_i$, and then applies a booling activation function 1211 that converts the keyphrase vector elements into a series of 1s and 0s to form a first bool vector 1220. A second inversion bool vector 1222 is generated as an inverse of the first bool vector 1220. The bool vectors indicate which state positions propagated in the last iteration from state to state along the current multiple element state score vector 1209. In the second stage, an output (history or frame index) vector V 1238 is used in a recurrent manner by multiplying both of the bool vectors 1220 and 1222 by the output vector V 1238 in an element by element vector multiplication operation 1224 and 1230. The result is vectors X (1228) and Y (1234). In the third stage, vectors X and Y are added together or otherwise combined to form the current output vector V 1238 in such a way that a start-point frame index is propagated to the N-th element 1246 of the vector V, thereby indicating the location of the keyphrase start point in a sequence of input audio. The details and how these operations are implemented by the NNA are explained below.

Now in more detail for the first stage, the keyphrase state score vector S 1209 is input to a single neural network (NN) layer 1210 with a non-linear activation function 1211, represented by the graph as shown. The output is an element vector of N+1 elements with logical values {0, 1}. After multiplication of input vector with weights values −1, 0, or 1, and adding a bias as shown, a linear combination or sequence 1210 of S is produced:

$$\{1, S_1 - S_0, S_2 - S_1, \ldots, S_N - S_{N-1}\}. \quad (8)$$

The linear sequence (8) is represented by nodes 1212. In other words, NN layer 1210 may be a fully connected layer so that all elements of keyphrase score vector 1209 are initially applied to each node in the network. Thus, those elements that are not to be used at a particular node of sequence 1212 have a weight of zero so those unwanted elements drop out. Only those elements from vector 1209 that are to be used at a node have a weight of 1 or −1. Thus, for example, the weights W for a node 1212a are shown to be −1 for element $S_1$, 1 for element $S_0$, and 0 for all other elements. This is repeated for each node in sequence 1212. The first node 1213 in the sequence 1212 is a place holder node of 0 to align the resulting vector with another vector V for vector multiplication performed for reasons explained below. The bias is then added to the element difference (for example $S_1 - S_0$ at node 1212a), and this resulting sequence is represented by equation (8) above. The resulting sequence is then provided as input to the activation function 1211.

Thus, a step booling activation function 1211 promoting positive inputs is applied:

$$F(x) = \text{bool}(x > 0) = \{1 \text{ if } x > 0, 0 \text{ if } x \leq 0\} \quad (9)$$

where x is one of the elements of the layer sequence (8) explained above. As a result, the following first bool vector 1220 is generated:

$$\{1, \text{bool}(S_0 < S_1), \text{bool}(S_1 < S_2), \ldots, \text{bool}(S_{N-1} < S_N)\} \quad (10)$$

The 1, formed from place holder node 1213, now forms a place holder 1221 on bool vector 1220 to align the bool vector 1220 with corresponding elements of an output vector V described below, and specifically to align the place holder element 1221 with the first element of the output vector V 1226.

Next, a second inverse bool vector 1222 is derived by using logical inversion operations on elements 1, ..., N of the sequence (8), or by applying inverted operations to the elements of the first bool vector 1220. The logical inversion is realized on an NNA by using a single affine layer with a bias, and with outputs equal to (1+(−1)*X) for each input element X (whether X is from the first bool vector 1220 or sequence (8) 1212). The derived second inversion vector 1222 can be represented as:

$$\{\text{bool}(S_0 \geq S_1), \text{bool}(S_1 \geq S_2), \ldots, \text{bool}(S_{N-1} \geq S_N)\} \quad (11)$$

The result here is that the first bool vector 1220 holds a value of 1 at a position where score propagation does not happen in a hidden Markov model (HMM) network structure operated by an NNA for example, and where $S_{i-1} < S_i$ is true, and 0 otherwise. The second inverted vector 1222, however, holds a 1 at each position where a score propagation does happen in an HMM when ($S_{i-1} \geq S_i$ is true) for example and 0 otherwise. As a result, the first bool vector 1220 indicates the positions of elements in the vector 1220 where score propagation does not happen in the HMM, and the second (derived) inverted vector 1222 indicates the positions of elements where score propagation happens in the HMM. Propagation between consecutive HMM states is associated with transitions between phonemes of a keyphrase when respective audio samples of a keyphrase are being processed by DNN unit 1202. This helps to respectively propagate historic frame indices stored in start-point tracking vector 1238 in a next stage of processing, and thereby, to correlate an HMM state sequence with chronological numbers of audio input frames of a corresponding keyphrase phoneme sequence, which will be explained in more detail below.

In the second stage, element-wise vector multiplication is performed in parallel on the two bool vectors 1220 and 1222 that were produced in the first stage, and by multiplying each bool vector by a current output history vector V in a recurrent manner. Specifically, each current output vector V $\{V_i, i=0, \ldots, N\}$ 1238 (also referred to as the start-point tracking vector) only stores a frame index and is initialized with all zeros. A frame number forming an element of the frame index and of a vector V 1238 is merely a chronological number of an audio input frame that corresponds to the time instance providing one of the keyphrase state score vectors being analyzed. The start-point tracking vector V 1238 is updated in each iteration, based on input vector S 1209 and the previous state of V vector 1238. The expected result, which is the frame index number of a keyphrase start point (or beginning of a keyphrase) is available by identifying the moment in time that the start point of the keyphrase occurred, which is captured at the last element of the V vector: $V_N$. This happens because the number of an audio input frame identifying a beginning of a keyphrase is propagated along the vector 1238 as the sequence of phonemes that construct the keyphrase is processed by acoustic scoring unit 1202. The input frame index corresponding to the keyphrase beginning is propagated until the last element of the vector 1238 in the way mentioned just above, and with further details below.

To generate the current output vector V 1238, the current vector V is used as a history vector in a recurrent way, shown by arrows 1240 and 1242. Thus, this operation can be described as using the same previous state of vector V (or just previous vector V) 1226 and 1232 to multiply by the two bool vectors 1220 and 1222 to generate a current vector V 1238. This is performed by separately multiplying what is now a previous vector V 1226 and 1232 by the two bool vectors 1220 and 1222, where the multiplication is shown by operators 1224 and 1230. To perform this multiplication while using an NNA implementation, a diagonal matrix multiplication may be used to perform the vector multiplication 1224 and 1230. The multiplication 1224 of the first bool vector (also referred to as a logical vector) 1220 and the previous vector V 1226 produces a vector X 1228 as:

$$X = \{X_0 = V_0; X_i = V_i * \text{bool}(S_{i-1} < S_i) \text{ for } i=1, \ldots, N\} \quad (12)$$

It will be noted that the first element 1221 of the bool vector 1220 has a 1 and aligns with the first element 1227 ($V_0$) of the previous vector V 1226 so that the first element $V_0$ 1227 is not changed by the multiplication here. The result is a vector X 1228 that factors a previous frame index ($V_i$) 1226 where score propagation does not happen at this element, including a $V_0$ as $X_0$ maintained at the beginning of the vector X 1228.

The second multiplication operation 1230 on the inverse bool vector 1222 and previous vector V 1232 ($V_0$ to Vn)

shifted by one so that $V_1$ aligns with the $S_0$ bool operation at bool 1222 and the resulting $Y_1$, which produces a vector Y 1234:

$$Y\{Y_i = V_{i-1} * \text{bool}(S_{i-1} \geq S_i) \text{ for } i=1, \ldots, N\} \quad (13)$$

which has anew frame index ($V_{i-1}$) where score propagation happens in the HMM. For the inverted bool multiplication 1230, no place holder element is provided, and therefore $Y_1 \ldots Y_N$ elements can update $V_1 \ldots V_N$ elements of vector 1238, while $V_0$ element will be updated separately. It also will be understood then that vector X has one more element than vector Y.

In the third stage, the NNA combines the X and Y vector together into a new current frame index for a current vector V 1238 by summing up elements $1, \ldots, N$ from the X and Y vectors 1228 and 1234 in element by element manner. The element-wise addition is realized using a single affine layer using weights of 1. The $V_0$ element is incremented 1244 by 1 using bias. This allows tracking of the currently processed chronological input frame number in the $V_0$ element, since $V_0$ is initialized with 0 and incremented on each iteration. The vector V 1238 is therefore updated as follows:

$$V_0 \leftarrow V_0 + 1 \quad (14)$$

$$V_i \leftarrow X_i + Y_i = V_i * \text{bool}(S_{i-1} < S_i) + *V_{i-1} * \text{bool}(S_{i-1} \geq S_i) = \{V_{i-1} \text{ if } S_{i-1} \geq S_i, V_i \text{ otherwise}\}, \text{ for } i=1, \ldots N \quad (15)$$

As a result, a current frame index is stored in $V_0$, and frame indices are propagated through a V array ($V_i \leftarrow V_{i-1}$) along with score propagation in an HMM. This assures that the keyphrase start-point frame index number has been propagated to the N-th element at the keyphrase detection moment, which is the moment the KPD score goes above the threshold. The explanation why the keyphrase startpoint input frame index is propagated to the last element of output vector V is as follows. When the input frame comprising the first phoneme of the keyphrase is being processed, the index of a currently processed frame, which is the frame number of the keyphrase beginning, is available at element $V_0$ of current output vector V 1238. When the frames comprising the next phonemes of the keyphrase are being processed, respective HMM sequence states get highest scores $S_i$ in the score vector 1209 and the input frame index of keyphrase beginning is propagated respectively from $V_{i-1}$ to $V_i$ along the output vector 1238 for $i=1 \ldots N$, according to equation (15). The keyphrase beginning input frame index, when further propagated to vector elements $V_1 \ldots V_N$ as a result of processing the keyphrase phonemes, is not overwritten as a result of propagation equation (15) of subsequent input frame indices generated at element $V_0$ in equation (14). This is because the propagation ($V_i \leftarrow V_{i-1}$), according to equation (15), does not occur when $S_i$ score is the highest in the 1209 score sequence, which holds true as long as a keyphrase phoneme corresponding to i-th HMM state is being processed. Other details are disclosed in U.S. patent application Ser. No. 15/972,369, filed May 7, 2018, and titled, "Wake on Voice Key Phrase Segmentation", and Published as 2019/0043479, on Feb. 7, 2019, which is incorporated herein for all purposes. As the last step, the keyphrase start-point frame index number is read from $V_N$ to determine the start point of a keyphrase.

The keyphrase start and end points can then be useful for further processing of speech. As a result next stages of signal processing can extract user's speech accurately and thereby adapt better to user's speech and/or noise conditions. For example speaker identification, beam forming or ASR (automatic speech recognition) algorithms can benefit from the keyphrase start and end points. Moreover, some web-based voice services like Alexa Voice Service (AVS) perform a $2^{nd}$ or final cloud based key-phrase validation and for this purpose require accurate information about key-phrase position in the input stream.

Figure 13:
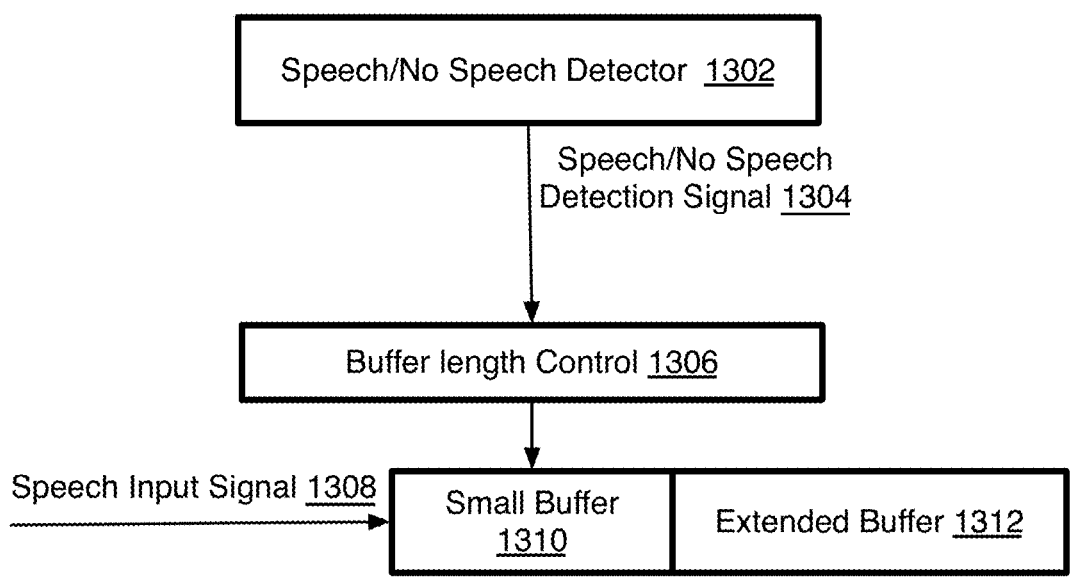
FIG. 13 is a schematic diagram of an audio data buffer size control system according to at least one of the implementations described herein.

Referring now to FIG. 13, a dynamic audio data buffer size (or length management) control system 1300 is provided for audio data buffer size management while performing autonomous neural network acceleration so that a DSP still is not needed despite using such buffer size control. Specifically, in systems that perform keyphrase detection as part of an overall speech (or personal) assistant, it is often necessary to buffer input audio speech data coming from one or more input microphones. Often, the keyphrase detection is performed in the edge (local) device such as a phone or smart speaker, and the speech assistant is located at a remote network server for example. In this case, the buffer is used to store the input audio speech data, and after the keyword is detected, the content of the buffer is sent to the speech assistant. In many services, speech data corresponding to a time before, during, and after the utterance of the keyphrase must be sent to the speech assistant. The buffer therefore needs to be long enough to store both the audio in the specified duration (typically 400+ ms) before the keyphrase and the keyphrase itself, and stored in the buffer before the keyphrase is detected by the KPD algorithm (typically at a time that is at or near the end of the keyphrase). A network server makes use of this information for reprocessing of the input speech because the audio data before the keyphrase can provide background noise information.

Inefficiency arises because maintaining data on a volatile memory such as RAM consumes power, and the power can be wasted because the KPD systems often store audio data in the same reserved buffer size even when much smaller buffers could be used to hold smaller amounts of data provided when no speech is detected in the audio input. Particularly, the typical total length of a KPD speech buffer is 2-3 seconds. An SRAM memory used to store this speech buffer is, for example, 2 seconds×16 kHz×2B=64 kB for one microphone at 16 bits per sample, and 4×2 seconds×16 kHz×3B=384 kB for 4 microphones at 24 bits per sample. For a silicon process that has high leakage power (for example, for Intel 1273 14 nm process), this size of memory makes a noticeable contribution to the overall power consumption of the overall solution (for example, at ~38 uW per 32 kB, the leakage is 38×384/32=456 uW.) This is a significant amount when it is desirable to maintain an overall SoC power at less than about 1 mW and preferably less than about 500 mW.

System 1300 solves these issues by varying the audio data buffer size depending on whether speech was detected in the audio input. Specifically, the default is to provide a smaller buffer size and then to extend to a larger buffer size when the start of speech is detected. To implement this, system 1300 uses a signal 1304 indicating a start of speech generated by the integrated neural network-based speech/non-speech detector 1302 such as a positive final speech score, such as those described above. The signal 1304 here can be used to control the length of an input buffer needed as part of the overall keyphrase detection process. Particularly, if no keyword event is detected, then a buffer length control 1306 sets or maintains the buffer size at a small audio data buffer 1310, and data of the speech input signal 1308 is stored in the smaller audio data buffer 1310. In general, most of the time, there is no speech at the microphones so most of the time the smaller audio data buffer 1310 can be used with the keyphrase decoders described herein, and the corresponding leakage power is reduced (typically a savings of 80% of the leakage power from using a fixed large memory buffer). When speech is detected, however, the buffer length control 1306 sets the extended audio data buffer 1312 to be used with a larger size than the smaller buffer, and the data of the speech input signal 1308 is stored in the extended audio data buffer 1312. Then the content of the extended audio data buffer 1312 is streamed to the remote speech assistant until the end of the speech is detected or some maximum time is reached. When the speech detector indicates that there is no speech again, the control 1306 reverts the buffer size back to the smaller size audio data buffer 1310. The size of the smaller audio data buffer 1310 would typically be 400 to 700 ms while the extended buffer 1312 would be 2-3 seconds in duration.

When the signal 1304 is used to wake a speech (or personal) assistant application, such applications are often operated on a System on a Chip (SoC) hardware. Thus, this technique reduces SoC power consumption while performing keyphrase detection. Further reduction in time delay and power consumption is achieved when the start of speech detection signal was obtained from an NNA operating a keyphrase decoder with an integrated speech/non-speech detector as described above and provides the signal 1304 for control of the buffer length management.

Figure 14:
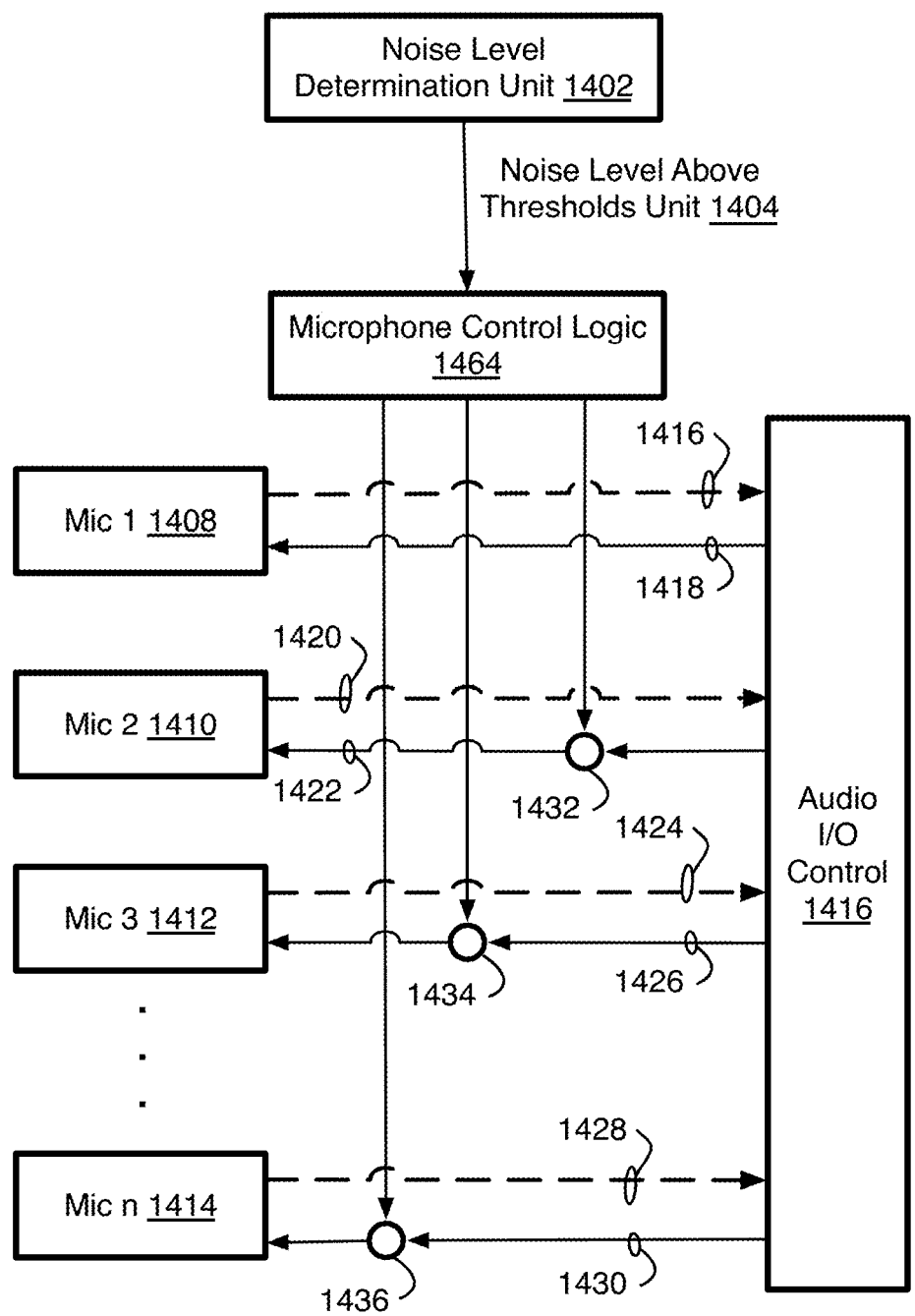
FIG. 14 is a schematic diagram of a dynamic microphone management control system according to at least one of the implementations described herein.

Referring to FIG. 14, a dynamic microphone management control system 1400 is provided to reduce the number of active microphones on a microphone array to reduce power consumption while still maintaining keyphrase detection on autonomous neural network accelerators. For far field applications for example in residential smart speakers, such speakers usually have multiple input microphones and associated pre-processing algorithms to improve the performance of keyphrase detection or speech recognition algorithms. Typically there would be 2 to 8 microphones in such a device. Each microphone consumes power (typically ~400 uW for a low quality microphone and ~900 uW for a high quality microphone). For low power applications—especially battery powered applications—there is a need to keep the power consumption low to extend battery life. Having, for example, 8 microphones continuously active consumes a lot of power. However, if the environment is quiet it may not be necessary to have all 8 microphones active, and the performance from a single microphone may be sufficient. If the noise level can be determined, then it's possible to use a signal indicating the noise level to control the number of microphones that are active.

Thus, the present system 1400 has a noise level determination unit 1402 that provides a noise indicator signal 1404 that indicates when a noise level is above a threshold. Normally such a noise level determination algorithm would be implemented on a DSP. For this implementation, however, the noise level determination algorithm is implemented as a neural network and run on an autonomous neural network accelerator, such as an Intel ANNA. The noise level determination unit 1402 uses the NNA to perform an energy-based noise detection: when a long-term signal energy obtained by known processes is higher than a certain threshold, a trigger signal 1404 is sent to the microphone control logic 1464. The comparison to the threshold can be performed on an NNA layer for example. This can be extended to more sophisticated noise level estimation operations that also estimate the distance of the speaker to the mics and/or estimate the reverb in the room by known processes.

Once the indicator signal 1404 is received, a microphone control logic 1464 can activate or deactivate one or more microphones here shown as Mic 1 1408, Mic 2 1410, Mic 3 1412 up to Mic n 1414. The microphones 1 to n are respectively shown receiving input control signals 1418, 1422, 1426, and 1430 from an Audio I/O control 1416 and that may include a clock signal. Also, respective output status signals 1416, 1420, 1424, and 1428 are received from the microphones at the Audio I/O control 1416. By one approach, the microphones are controlled by an SoC, and an SoC may provide the clock signal to the microphone via the Audio I/O control 1416, and if this clock signal is turned off, then the microphone will turn off. Thus, the microphone control logic 1464 may provide autonomous functionality by automatic management of the input microphone signals. Specifically, the control logic 1464 may have intercept logic 1432, 1434, and 1436 that blocks the clock signal from reaching the microphones, thereby turning off the microphones. Such interceptor logic may by set for one or more microphones, less then all microphones (as shown in the present example where Mic 1 does not have the intercept logic), or all microphones. This microphone control adds the capability to use a noise level indicator signal from a neural network algorithm running on a NNA, rather than a DSP, for the noise level determination and running on an NNA, such as ANNA by one example.

Figure 15:
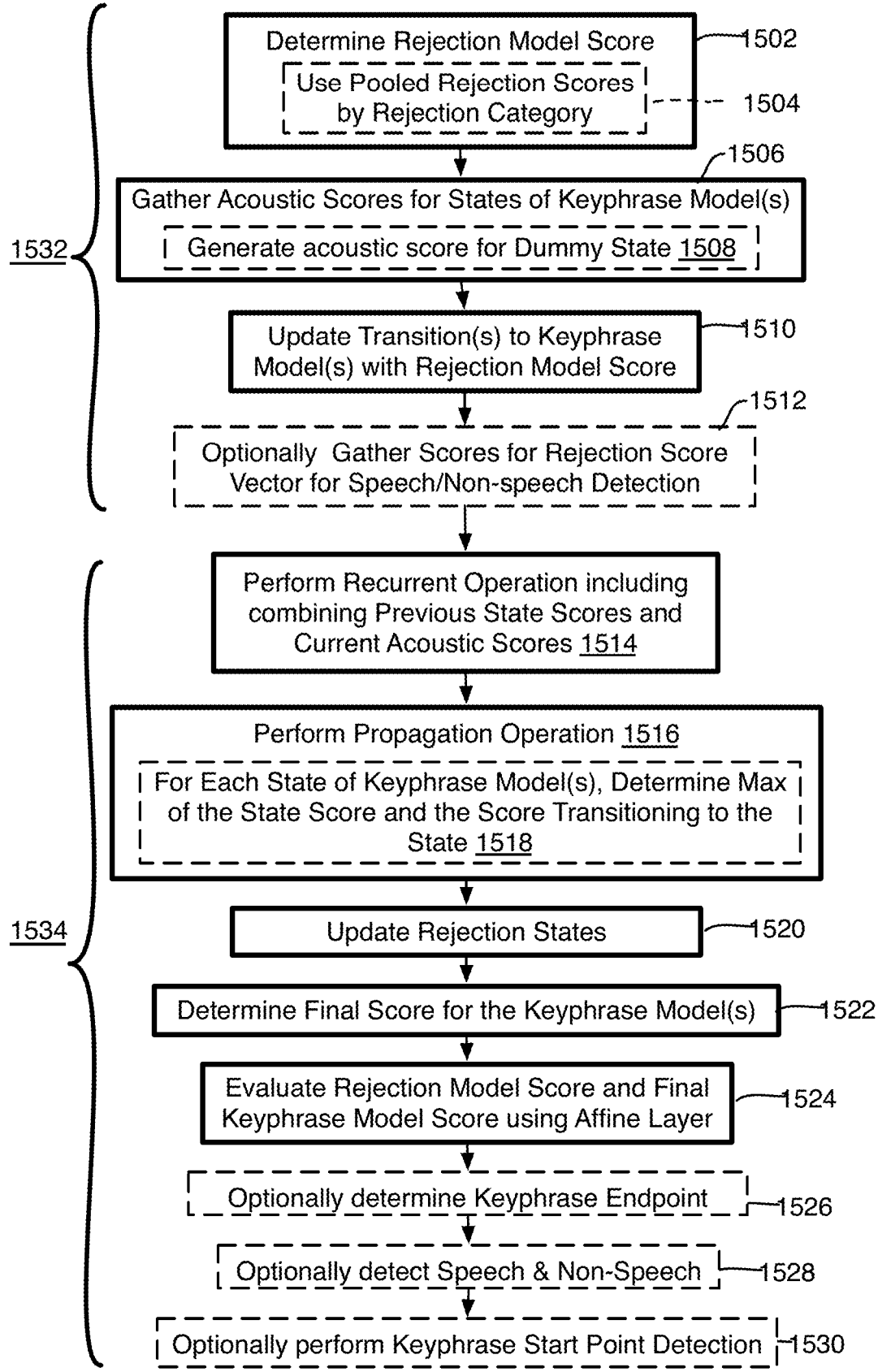
FIG. 15 is a flow chart of a detailed method of neural network keyphrase detection according to at least one of the implementations herein.

Referring to FIG. 15, an example process 1500 for keyphrase detection using a neural network is arranged in accordance with at least some implementations of the present disclosure. Process 1500 may include one or more operations 1502-1530, generally numbered evenly, as illustrated in FIG. 15. Process 1500 or portions thereof may be performed by any device or system or the like discussed herein to provide keyphrase detection performed on a neural network, and by one form with certain operations to be performed on an NNA, and by one form without the use of, or very limited use of, a DSP. Such all-neural network operations also may include any integrated or accompanying processes such as speech/non-speech detection and keyphrase start or end point detection, as well as multiple microphone control and audio data buffer size control or other applications not described herein. Process 1500 or portions thereof may be repeated any number of times to provide keyphrase detection via a device or system. Furthermore, process 1500 will be described herein in reference to systems 200 or 1600 of FIG. 2 or 16 respectively, and where relevant.

Referring first to FIG. 16 to show an example audio processing system 1600 for use with process 1500, system 1600 for performing keyphrase detection is arranged in accordance with at least some implementations of the present disclosure. System 1600 may include one or more neural network accelerators 1604 as well as other processor(s) 2603 such as a central processor 1628 and optionally a digital signal processor 1630, a memory 1608, and microphone 201. The system 1600 also may include logic unit(s) or module(s) 1610 including a feature extraction module 202, acoustic scoring module 203, keyphrase detection decoder 204, and controller 206, many of which are to be implemented by the NNA 1604 as described herein. In some implementations, the logic units 1610 also may include voice activity detection module 207. The keyphrase detection decoder 204 optionally may include, or may have as a separate unit, a speech/non-speech detection unit 212, a keyphrase (KP) end point detection unit 1632, and a KP start point detection unit 1634. The logic units 1610 also optionally may include microphone control unit(s) 1636 (that includes any control or noise determination unit for this purpose) and buffer size control unit(s) 1638 as described above.

Memory 1608 may store keyphrase and rejection models 205, acoustic model 208 and an external neural network (NN) buffer 1640. Memory 1603 may also store audio data, input speech data, voice activity detection parameters or data, coefficient data, feature vectors, scores, output scores, keyphrase scores, log likelihood scores, thresholds, multiple element acoustic score vectors, multiple element state score vectors, iteration data, state values or scores, weights, bias values or constants, or any other data or data structures as discussed herein and/or used for neural network operations, and whether or not stored in the external NN buffer.

The NNA 1604 may have specific-purpose dedicated hardware to implement the neural network operations described herein, and may include an input buffer 1612 to hold audio data (such as a vector of features or scores) to be propagated, and a weight buffer 1614 to hold weights applied to the input data often in the form of a weight matrix. It will be understood that these local buffers may be physically located on a board or chip with the other processing components of the NNA or could be physically external to the NNA such as at the external NN buffer 1640. The NNA 1604 also may have data path logic 1616 that has a multiple-accumulate circuit (MAC) 1618 that performs highly parallel operations (such as multiplication and sums) to propagate the input data, a sum unit 1620 that sums together intermediate summed values and bias values for example, a constant/bias buffer 1622 that holds bias values to be provided to the sum unit 1620, an activation function unit 1624 that performs any other operations of an activation function unit not already performed at data path logic 1616, and an output buffer 1626. It will be appreciated that NNA 1604 may have many other components (units, modules, logic, buffers, and so forth) to perform the neural network operations whether hardware, software, or a combination of both. Such other NNA components that may be included in example NNA 1604 may be disclosed by U.S. Patent Publication No.: 2018/0121796, and published on May 3, 2018, which is incorporated herein for all purposes.

Otherwise, central processor 1628 and digital signal processor 1630, when provided, may include any number and type of processing units that may provide the operations as discussed herein, if provided at all. Such operations may be implemented via software or hardware or a combination thereof. For example, digital signal processor 1630 may include circuitry dedicated to manipulating data obtained from memory 1608 or dedicated memory. Furthermore, central processor 1628 may include any number and type of processing units or modules that may provide control and other high level functions for system 1600 as well as the operations as discussed herein.

Memory 1603 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1603 may be implemented by cache memory. In an implementation, at least NNA 1604 and memory 1608 may be implemented as a system on a chip.

Returning to process 1500, operations 1502-1512 may provide a preparation phase 1532 for an execution phase 1534 of operations 1514-1530 that may include vectorized operations performed by a neural network accelerator as discussed herein. It will be understood that other processors than an NNA may perform data gathering tasks to provide data to the NNA such as NNA 1604 for example, and may obtain data from the NNA 1604 to use with other applications or programs. Such other processors may be on the same device as the NNA, and/or same chip or chip set as the NNA, such as on an SoC, or may be remote from the NNA. Herein, when it is mentioned that a neural network operation is performed on an NNA, this refers to at least those operations related to propagating data through a neural network that are performed by an NNA. Otherwise, which operations are performed by the NNA can be derived from the context of the language. Thus, an NNA does not necessarily perform each and every computer implemented operation mentioned herein. In other words, other processors may handle in/out data transmission operations that first feed audio data to the NNA and obtain a notification once a keyphrase is detected, but by one form, no other DSP is needed between feature extraction, acoustic scoring, and keyphrase decoding.

The process 1500 may include "determine rejection model score" 1502, where a rejection model score may be determined for the rejection model, such as rejection model 301. The rejection model score may be determined using any suitable technique or techniques. In an implementation, rejection model score may be a maximum of a best rejection score corresponding to the single rejection model (e.g., self loops of the model) obtained by pooling the rejection scores. For example, with respect to FIG. 6, operation 1502 may provide current acoustic score 611 for single state rejection model 311 and of multiple element acoustic score vector 610.

By an optional form, this operation for determining the rejection model score may include "use pooled rejection scores by rejection category" 1504. Thus, by one form, at least four acoustic categories of rejected phonetics, spoken noise, silence and non-spoken noise may be scored, and these four categories are first pooled separately and then together as described above where pooling may be the maximum value, average value, or other operation combining or selecting among the rejected acoustic scores. By one form, the categories are pooled into speech and non-speech pooled scores that can be used for integrated speech/non-speech detection as well as pooled together to form the rejection acoustic score state 611 for keyphrase detection. It will be appreciated that other options exist rather than combining all four rejection categories, such as combining or pooling the phonetics and silence without using the noise-related categories, or any other desirable combination. Also as described above, the pooling may be performed on an NNA 1604 by copying acoustic scores of a certain category input from an acoustic scoring unit, and into the desired pooling vectors, and then perform the pooling by using 0s and 1s at an affine layer operated by the NNA to perform the mapping as described above.

Process 1500 may include "gather acoustic scores for states of keyphrase model(s)" 1506, where scores from an acoustic scoring unit may be gathered for the keyphrase model or models 302, and to be input as a multiple element acoustic score vector to the model-updating data structure 601. For example, scores may be gathered for keyphrase model 302 for a single descriptor 601, or for multiple descriptors 830 and 840 (FIG. 8) being processed in parallel, or concatenated multiple descriptors 904 and 906 (FIG. 9), or the like, when multiple keyphrases are being detected. The scores may be gathered using any suitable technique or techniques so that the scores can be processed by an NNA. In an implementation, scores 214 are gathered from acoustic scoring model and stored in memory.

Optionally, this operation may include "generate acoustic score for dummy state" 1508, which may involve obtaining an acoustic rejection score, and by one form, that is the same rejection score $P_0$ being used for the main keyphrase detection as the dummy state. This score is placed as the last (or actually just after the last keyphrase detection state (or in other words, N+1)) position along the multiple element acoustic score vector 610. This score is processed the same as the keyphrase detection vectorized operations, except that no transition takes place from the main keyphrase detection state scores. An end point determination is then generated by using NNA 1604 for example and as described above, and indicates whether the current time instance being analyzed is the endpoint of the keyphrase.

Process 1500 may include "update transitions to keyphrase models with rejection model score" 1510. For example, transitions from rejection model 301 such as transitions 313 may be updated with the rejection score determined at operation 1502. The transitions may be updated using any suitable technique or techniques. This operation also may include updating scores for optional silence states of the keyphrase model.

Process 1500 may include "optionally gather scores for rejection score vector for speech/non-speech detection" 1512, and this involves obtaining the speech and non-speech pooled scores and placing them in a certain sequence, as explained above, to form the vector Q 730 (FIG. 7). By one form, this includes placing the non-speech pooled score at the two ends of vector Q while placing the speech score in the middle positions of vector Q to establish a non-speech to speech transition on one end of the vector and then a speech to non-speech transition at the other end of the vector. The vector Q is then ready for vectorized operations the same or similar to that being performed for the keyphrase detection portion of the data structure of the decoder, except here for speech/non-speech detection.

Process 1500 may include "perform recurrent operation including combining previous state scores and current acoustic scores" 1514. As mentioned herein, this may involve combining the multiple element acoustic score vector with a previous multiple element state score vector where the vectors include a score for the rejection model and each state of the keyphrase model or models. By one form, this vectorized operation may determine an element by element sum between the two vectors. For example, multiple element acoustic score vector 401 may be summed, based on vectorized operation 403, with previous multiple element state score vector 402 to generate intermediate score vector 404. The vectorized summing operation may be performed on dedicated hardware such as a neural network accelerator 1604 by using an affine layer for example and by having the scores of the previous multiple element state score vector added to the elements of the multiple element acoustic score vector by using the bias buffer and logic 1622 and 1620, which results in the element by element sums being performed simultaneously, or substantially simultaneously, in parallel, or the like. This is part of the operation 622 and recurrent arcs 624 (FIG. 6), and is shown by vector 1016 (FIG. 10).

Process 1500 may include "perform propagation operation" 1516. A propagation operation is then performed that moves scores (or at least the factoring of scores) from one state to another from an initial state to a final state on the keyphrase model 302 as represented by transition 323 (FIG. 3) and from $S_0$ to $S_N$ on the transitions 629 shown on multiple element state score factor vector 624 (FIG. 6). This may be accomplished by using, for each state of the keyphrase model or models, a vectorized operation that may include "for each state of keyphrase model(s), determine max of the state score and the score transitioning to the state" 1518. This may involve determining a maximum of the state score for the state and the state score transition to the state. For example, max operations may be applied to adjacent values or elements of the intermediate score vector 404 to determine the maximum of the state score and the transition score as explained above with decoder data structure 400 and decoder 600. To perform this operation on an NNA using neural network circuits and/or logic, 2×1 max pooling operation 1018 may be performed as explained with NNA 1000 (FIG. 10), although other methods could be used when not using the NNA. It should be noted that the max pool operation is not applied to the rejection state $S_0$ 451, and this state changes from the earlier combination (or summation) of vector operation as mentioned above as shown on decoder data structure 400.

Process 1500 may include "update rejection states" 1520, where, for each rejection state, including the rejection state of the rejection model, the states may be updated based on the rejection state score determined at operation 1502. For example, single rejections state 311 of rejection model 301 and those states of the keyphrase model or models that transition from the rejection state may be updated with the rejection state score determined at operation 1502.

Process 1500 may include "determine final score for keyphrase model(s)" 1522. When only a single keyphrase model is implemented, the state score corresponding to the final or last state of the keyphrase model may be accessed as the final score for the keyphrase model. For example, with respect to FIG. 6, if multiple element state score vector 624 represents a single keyphrase model, score $S_N$ of current scores 627 may provide the final score. If multiple keyphrase models are used, those scores of current scores 627 corresponding to final states of the keyphrase models may be accessed and maximum of the final scores may be determined as the final score of operation 1522, or these scores may be analyzed separately for each different keyphrase being detected.

Process 1500 may include "evaluate rejection model score and final keyphrase model score using affine layer" 1524, and particularly this refers to the scores of the current multiple element state score vector. By one form, an affine layer is used so that this operation can be performed as a neural network by an NNA 1604. By one form, these are the only two inputs into the affine layer to determine the difference between the two values and where one has a weight of −1 and the other score has a weight of 1. The difference is then separately compared to a threshold. By another form, the threshold also is an input to the affine layer. By yet another form, all of the scores of the current multiple element state score vector are input to the affine layer except that the middle scores between $S_0$ and $S_N$ are given a weight of 0 to drop out those scores as explained above. The weights are assigned to the scores so that when the affine layer output is positive (or negative), the keyphrase has been detected in the audio input. When the keyphrase has been detected, the device itself and/or other applications such as an ASR application for a PA can be activated or awoken as discussed above.

Also mentioned above, a number of other integrated processes may be implemented on a decoder and to be processed by an NNA rather than a DSP or general-purpose processor. For example, process 1500 may include "optionally determine keyphrase endpoint" 1526. As described above with decoder 600, a dummy state may be placed at the end, or other place, of the multiple element vectors to separately receive a rejection state score $P_0$ that is being used for keyphrase detection, and then to perform the same recurrent operation on that score without a transition from the keyphrase states. A comparison of a current dummy state 634 to the final state $S_N$ of the keyphrase detection can then identify the endpoint of the keyphrase. This determination also may be implemented as an affine layer.

Another integrated process as shown by decoder 700 is speech/non-speech detection. Thus, process 1500 may include "optionally detect speech and non-speech" 1528, and this may include the use of an NNA 1100 (FIG. 11) and/or 1604 (FIG. 6) for example. This involves pooling of acoustic rejection scores by category to form a speech pooled score and a non-speech pooled score, and then re-ordering those two pooled scores into a rejection vector Q that is recurrently propagated to a rejection state score vector T as described above with decoder 700 and NNA 1100. The rejection state scores on vector T are analyzed where the scores indicate a transition from non-speech to speech, and then from speech back to non-speech as described above. The two scores for these two transitions then may be analyzed separately to determine if either transition is true, and again by using affine and other layers operated by an NNA.

As another operation modified to be performed on an NNA rather than a DSP, general-purpose processor, or other more processor inefficient with NNA operations, process 1500 may include "optionally perform keyphrase start point detection" 1530, and this may occur after being provided the state scores of the current multiple element state score vector as outputs from the keyphrase decoder. By one option, this may be implemented only when a keyphrase has been detected and may not always analyze each output from the keyphrase decoder. By other options, however, the start point detection is always active and executed in each iteration before a keyphrase is detected in order to properly track the start point input frame index. In other words, the start point detection algorithm may operate in the background, and may be "always on", and its result (start point input frame index) is ready just at the moment when the keyphrase is detected (the KPD score threshold is crossed). When the keyphrase has been detected, keyphrase start point detection may be implemented by converting the scores of the multiple element state score vector by a booling process implemented as a neural network layer with a booling activation function, and converted into a series of 1s and 0s that indicate which score positions from the keyphrase detection output vector experienced propagation in an HMM of keyphrase model, implemented as multiple states sequence described in detail earlier (FIG. 3 and FIG. 4), and forming one forward and one inverted bool vector of 1s and 0s. By multiplying the bool vectors by a recurrently applied output vector of indexed frame locations of frames of the audio input, it can be determined exactly which frame indicates the start point of the keyphrase, all as explained in detail above with NNA 1200 (FIG. 12).

With the implementation of the neural network operations described above, an all-neural network keyphrase process can be implemented eliminating or significantly reducing the use of a DSP or other general-purpose processors. This may include operations for feature extraction, acoustic scoring, keyphrase decoding, speech/non-speech detection, and/or keyphrase start point and end point detection.

It will be understood that while an affine layer is described as the layer used to perform the operations herein on an NNA, these layers are chosen for their simplicity and accuracy. Thus, other types of neural network layers could be used as long the operations can be performed by using a neural network, and by one implementation, can be performed on a neural network accelerator or other hardware circuit or logic that is arranged for the specific purpose of operating one or more neural networks.

It will also be understood that other end-applications can benefit from the neural network operated speech/non-speech detection in addition to the buffer size control system 1300 (FIG. 13) and the multiple microphone control 1400 (FIG. 14) as described above.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement any systems, operations, modules or components as discussed herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" or "unit" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 17:
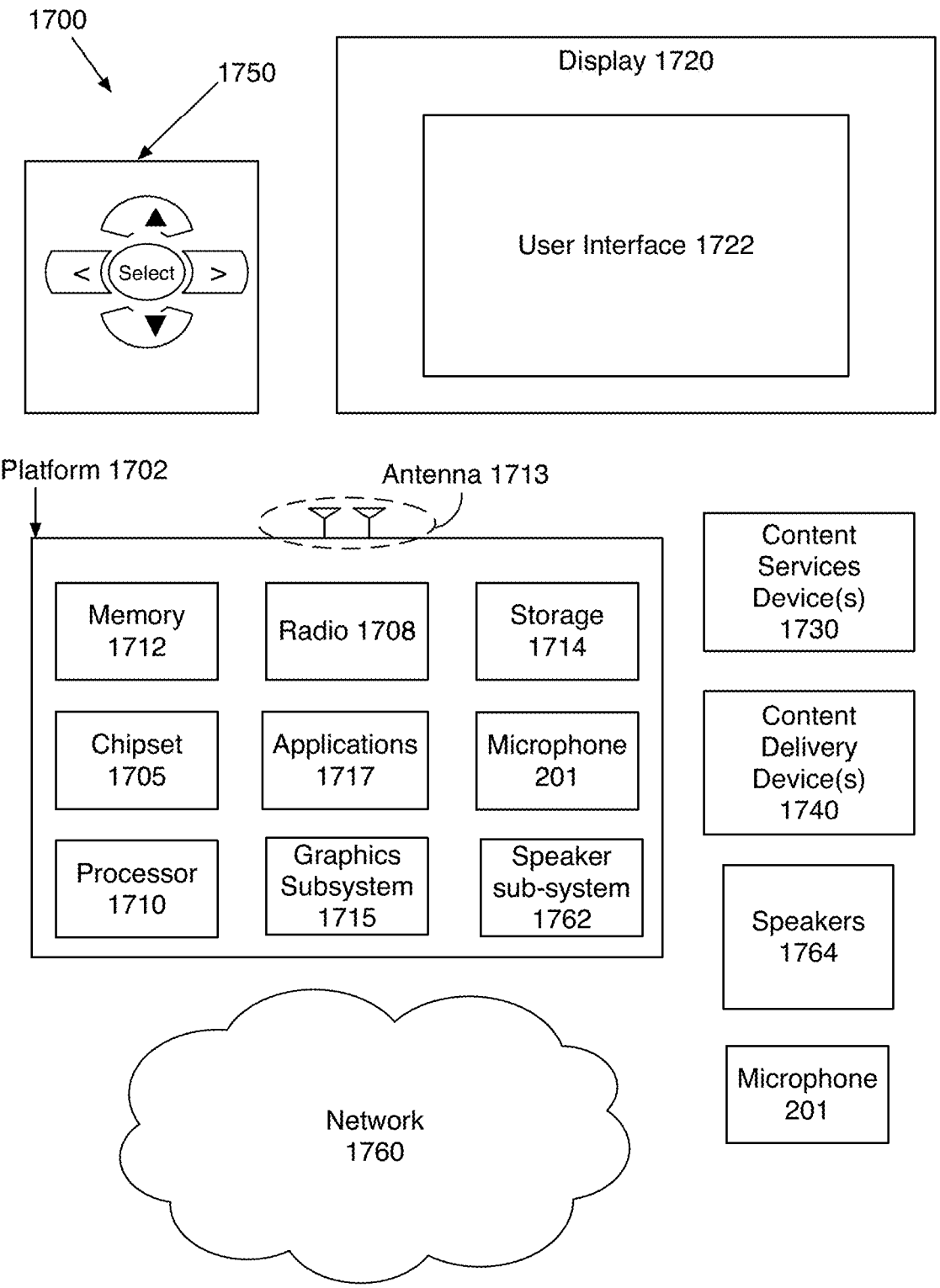
FIG. 17 is an illustrative diagram of an example system.

FIG. 17 is an illustrative diagram of an example system 1700, arranged in accordance with at least some implementations of the present disclosure. In various implementations, system 1700 may be a media system although system 1700 is not limited to this context. For example, system 1700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet, smart speaker, or smart television), mobile internet device (MID), messaging device, data communication device, cameras (e.g. point-and-shoot cameras, super-zoom cameras, digital single-lens reflex (DSLR) cameras), and so forth.

In various implementations, system 1700 includes a platform 1702 coupled to a display 1720. Platform 1702 may receive content from a content device such as content services device(s) 1730 or content delivery device(s) 1740 or other similar content sources. As shown, in some examples, system 1700 may include microphone 201 implemented via platform 1702 or separately from the platform. Platform 1702 may receive input speech via microphone 201 as discussed herein. Likewise, a speaker sub-system 1762 may be provided to control speakers 1764 to emit audio input as sound. A navigation controller 1750 including one or more navigation features may be used to interact with, for example, platform 1702 and/or display 1720. Each of these components is described in greater detail below.

In various implementations, system 1700 may provide keyphrase detection as described. For example, keyphrase detection may be provide wake on voice capability for a device or environment as described. In other implementations, system 1700 may provide for generating a keyphrase detection model (e.g., including an acoustic model, a rejection model, and a keyphrase model). Such training may be performed offline prior to keyphrase detection for example.

In various implementations, platform 1702 may include any combination of a chipset 1705, processor 1710, memory 1712, antenna 1713, storage 1714, graphics subsystem 1715, applications 1716, microphone 201, and/or radio 1718. Chipset 1705 may provide intercommunication among processor 1710, memory 1712, storage 1714, graphics subsystem 1715, applications 1716 and/or radio 1718. For example, chipset 1705 may include a storage adapter (not depicted) capable of providing intercommunication with storage 1714.

Processor 1710 may be implemented as one or more neural network accelerators (NNAs), but otherwise where not limited to an NNA or when such structure can implement an NNA, a Complex Instruction Set Computer (CISC) or Reduced Instruction Set Computer (RISC) processors, x86 instruction set compatible processors, multi-core, or any other microprocessor or central processing unit (CPU). In various implementations, processor 1710 may be dual-core processor(s), dual-core mobile processor(s), and so forth.

Memory 1712 may be implemented as a volatile memory device such as, but not limited to, a Random Access Memory (RAM), Dynamic Random Access Memory (DRAM), or Static RAM (SRAM).

Storage 1714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1714 may include technology to increase the storage performance enhanced protection for valuable digital media when multiple hard drives are included, for example.

Graphics subsystem 1715 may perform processing of images such as still or video for display. Graphics subsystem 1715 may be a graphics processing unit (GPU) or a visual processing unit (VPU), for example. An analog or digital interface may be used to communicatively couple graphics subsystem 1715 and display 1720. For example, the interface may be any of a High-Definition Multimedia Interface, DisplayPort, wireless HDMI, and/or wireless HD compliant techniques. Graphics subsystem 1715 may be integrated into processor 1710 or chipset 1715. In some implementations, graphics subsystem 1715 may be a stand-alone device communicatively coupled to chipset 1705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1718 may operate in accordance with one or more applicable standards in any version.

In various implementations, display 1720 may include any television type monitor or display. Display 1720 may include, for example, a computer display screen, touch screen display, video monitor, television-like device, and/or a television. Display 1720 may be digital and/or analog. In various implementations, display 1720 may be a holographic display. Also, display 1720 may be a transparent surface that may receive a visual projection. Such projections may convey various forms of information, images, and/or objects. For example, such projections may be a visual overlay for a mobile augmented reality (MAR) application. Under the control of one or more software applications 1716, platform 1702 may display user interface 1722 on display 1720.

In various implementations, content services device(s) 1730 may be hosted by any national, international and/or independent service and thus accessible to platform 1702 via the Internet, for example. Content services device(s) 1730 may be coupled to platform 1702 and/or to display 1720. Platform 1702 and/or content services device(s) 1730 may be coupled to a network 1760 to communicate (e.g., send and/or receive) media information to and from network 1760. Content delivery device(s) 1740 also may be coupled to platform 1702 and/or to display 1720.

In various implementations, content services device(s) 1730 may include a cable television box, personal computer, network, telephone, Internet enabled devices or appliance capable of delivering digital information and/or content, and any other similar device capable of uni-directionally or bi-directionally communicating content between content providers and platform 1702 and/display 1720, via network 1760 or directly. It will be appreciated that the content may be communicated uni-directionally and/or bi-directionally to and from any one of the components in system 1700 and a content provider via network 1760. Examples of content may include any media information including, for example, video, music, medical and gaming information, and so forth.

Content services device(s) 1730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1702 may receive control signals from navigation controller 1750 having one or more navigation features. The navigation features of controller 1750 may be used to interact with user interface 1722, for example. In various implementations, navigation controller 1750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1750 may be replicated on a display (e.g., display 1720) by movements of a pointer, cursor, focus ring, or other visual indicators displayed on the display. For example, under the control of software applications 1716, the navigation features located on navigation controller 1750 may be mapped to virtual navigation features displayed on user interface 1722, for example. In various implementations, controller 1750 may not be a separate component but may be integrated into platform 1702 and/or display 1720. The present disclosure, however, is not limited to the elements or in the context shown or described herein.

In various implementations, drivers (not shown) may include technology to enable users to instantly turn on and off platform 1702 like a television with the touch of a button after initial boot-up, when enabled, for example. Program logic may allow platform 1702 to stream content to media adaptors or other content services device(s) 1730 or content delivery device(s) 1740 even when the platform is turned "off." In addition, chipset 1705 may include hardware and/or software support for 5.1 surround sound audio and/or high definition 7.1 surround sound audio, for example. Drivers may include a graphics driver for integrated graphics platforms. In various implementations, the graphics driver may comprise a peripheral component interconnect (PCI) Express graphics card.

In various implementations, any one or more of the components shown in system 1700 may be integrated. For example, platform 1702 and content services device(s) 1730 may be integrated, or platform 1702 and content delivery device(s) 1740 may be integrated, or platform 1702, content services device(s) 1730, and content delivery device(s) 1740 may be integrated, for example. In various implementations, platform 1702 and display 1720 may be an integrated unit. Display 1720 and content service device(s) 1730 may be integrated, or display 1720 and content delivery device(s) 1740 may be integrated, for example. These examples are not meant to limit the present disclosure.

In various implementations, system 1700 may be implemented as a wireless system, a wired system, or a combination of both. When implemented as a wireless system, system 1700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 17.

Figure 18:
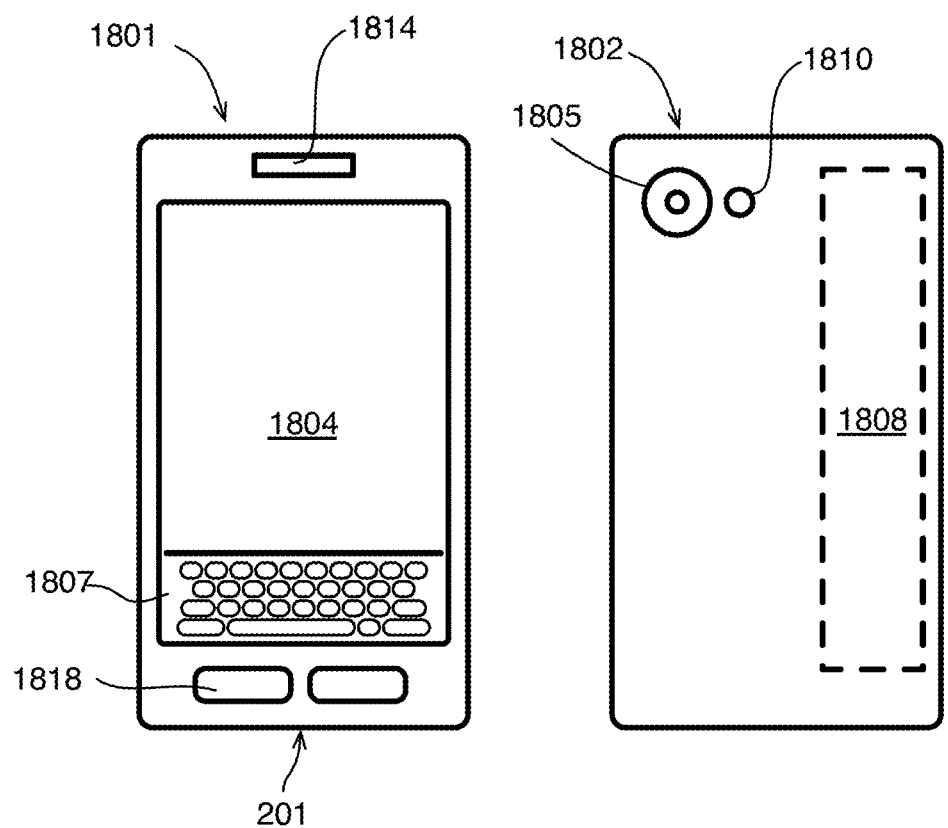
FIG. 18 illustrates an example device, all arranged in accordance with at least some implementations of the present disclosure.

Referring to FIG. 18, and as described above, systems 1600 and 1700 may be embodied in varying physical styles or form factors including a small form factor device 1800, arranged in accordance with at least some implementations of the present disclosure. Thus, in some examples, systems 1600 or 1700 may be implemented via device 1800. In other examples, other devices or systems, or portions thereof may be implemented via device 1800. In various implementations, for example, device 1800 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 18, device 1800 may include a housing with a front 1801 and a back 1802. Device 1800 includes a display 1804, an input/output (I/O) device 1806, and an integrated antenna 1808. Device 1800 also may include navigation features 1812. I/O device 1806 may include any suitable I/O device for entering information into a mobile computing device. Examples for I/O device 1806 may include an alphanumeric keyboard, a numeric keypad, a touch pad, input keys, buttons, switches, microphones, speakers, voice recognition device and software, and so forth. Information also may be entered into device 1800 by way of microphone 201, or may be digitized by a voice recognition device. As shown, device 1800 may include a camera 1805 (e.g., including a lens, an aperture, and an imaging sensor) and a flash 1810 integrated into back 1802 (or elsewhere) of device 1800.

Various implementations may be implemented using hardware elements, and including those specified above that are implemented as neural network accelerators (NNAs). Otherwise, when not specified, the implementations may be implemented as hardware elements, software elements, or a combination of both. Examples of other hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

A keyphrase detection device comprises memory storing received audio input; and at least one neural network accelerator communicatively connected to the memory to receive the audio input and to operate by: generating a multiple element acoustic score vector for a current time instance based on the received audio input, wherein the multiple element acoustic score vector comprises at least one acoustic score for at least one rejection model and acoustic scores for at least one multiple state keyphrase model, and wherein the multiple state keyphrase model corresponds to a predetermined keyphrase, recursively aligning elements of a previous multiple element state score vector for a previous time instance with the elements of the multiple element acoustic score vector, wherein the previous multiple element state score vector comprises at least one previous state score for the single state rejection model and previous state scores for the multiple state keyphrase model, generating an intermediate score vector by using scores from both the multiple element acoustic score vector and the previous multiple element state score vector, generating a current multiple element state score vector of a current time instance comprising performing a propagating operation with the intermediate score vector, and determining whether the received audio input is associated with the predetermined keyphrase by using scores from the current multiple element state score vector; and a controller to provide at least one command to perform an action when the received audio input is associated with the predetermined keyphrase.

The device also may include that a keyphrase detection unit autonomously operated by the network accelerator without using a digital signal processor to perform feature extraction, acoustic scoring, and keyphrase decoding by the neural network accelerator and without the use of a digital signal processor; wherein the neural network accelerator generates a final score by using a first state score based on the single state rejection model and a second state score that is one of the state scores based on the keyphrase model and wherein both the first and second state scores are from the current multiple element state score vector; wherein the generating of a final score comprising operating an affine neural network layer wherein the first and second state scores are inputs to the affine layer; wherein scores on the current multiple element state score vector in addition to the first and second state scores are input to the affine layer and are provided a weight of zero; wherein the final score is computed by using a threshold value as an input of the affine layer; wherein the threshold value has a weight of −1, the first state score has a weight of −1, and the second state score has a weight of 1; wherein the neural network accelerator operates as if performing a recurrent neural network layer comprising providing a just generated current multiple element state score vector as a previous multiple element state score vector to be used with a next multiple element acoustic score vector to generate the vector of intermediate state score values; wherein the neural network accelerator treats elements of the previous multiple element state score vector as bias values to be applied to element of the multiple element acoustic score vector; wherein the propagating operation is a determination of a maximum value among values of individual adjacent pairs of states along the intermediate score vector to form the current multiple element state score vector; wherein the neural network accelerator processes a dummy state added to the multiple element acoustic score vector to compute an end of a keyphrase in the audio input; wherein the neural network accelerator generates the at least one acoustic score for at least one rejection model by separately pooling multiple acoustic base scores of multiple rejection categories of silence, phonetics, speech noise and non-speech noise to form a single category score of each category before pooling the single category scores together to form a single acoustic rejection score.

By yet another implementation, a computer-implemented system for performing keyphrase detection comprises at least one microphone to capture audio input; memory to store the audio input; at least one processor communicatively coupled to the at least one microphone and at least one memory, and comprising at least one neural network accelerator to receive the audio input and operate by: generating a multiple element acoustic score vector for a current time instance based on received audio input, wherein the multiple element acoustic score vector comprises at least one acoustic score for at least one rejection model and acoustic scores for at least one multiple state keyphrase model, and wherein the multiple state keyphrase model corresponds to a predetermined keyphrase; recursively aligning elements of a previous multiple element state score vector for a previous time instance with the elements of the multiple element acoustic score vector, wherein the previous multiple element state score vector comprises at least one previous state score for the single state rejection model and previous states scores for the multiple state keyphrase model; generating an intermediate score vector by using scores from both the multiple element acoustic score vector and the previous multiple element state score vector, generating a current multiple element state score vector of a current time instance comprising performing a propagating operation with the intermediate score vector, and determining whether current state scores of the current multiple element state score vector indicate that the received audio input is associated with the predetermined keyphrase; and providing at least one command to perform an action when the received audio input is associated with the predetermined keyphrase.

By another example, the system provides that wherein the neural network accelerator generates both a speech final score and a non-speech final score comprising pooling at least some of the same base acoustic rejection scores used to generate the at least one acoustic score for the at least one rejection model; and using the speech and non-speech final scores to determine whether speech or non-speech exists in the audio input. wherein the neural network accelerator is to operate by forming a multiple element vector of pooled rejection acoustic scores by using the base acoustic scores; and performing operations on the multiple element vector of pooled rejection acoustic scores to form a speech final score and a non-speech final score; wherein at least one speech-related score of the multiple element vector of pooled rejection acoustic scores is based on the pooling of speech-related base rejection scores and at least one non-speech-related score of the multiple element vector of pooled rejection acoustic scores is based on the pooling of non-speech-related base rejection scores; wherein the base rejection scores of phonetics and speech-related noise rejection categories are pooled together to form the speech-related scores, and silence and non-speech noise categories are pooled together to form the non-speech-related scores; wherein the pooled rejection acoustic scores to be used as elements in the multiple element vector of pooled rejection acoustic scores are pooled together to form the at least one acoustic score of the at least one rejection model on the multiple element acoustic score vector to detect a keyphrase; wherein the first and last score of the multiple element vector of pooled rejection acoustic scores are based on the pooling of both the same of speech or non-speech-related base rejection scores and the acoustic rejection scores between the first and last scores are pooled rejection acoustic scores based on the other of the speech or non-speech-related base rejection scores; wherein the first and second scores of the current multiple element rejection state score vector is used to form one of the speech or non-speech final score, and the last and second to last scores of the current multiple element rejection state score vector are used to form the other of the speech or non-speech final score; wherein scores of the current multiple element rejection state score vector are input to an affine neural network layer operation to form the speech and non-speech final scores; wherein the weights of −1 are provided to one of the non-speech and speech scores of the current multiple element rejection state score vector and a weight of 1 to the other of the speech or non-speech scores of the current multiple element rejection state score vector; wherein the operations are the same operations as performed on the multiple element acoustic score vector to form a current multiple element rejection state score vector to be used to form the speech and non-speech final scores; wherein the neural network accelerator operates by at least one of: concatenating a plurality of multiple element acoustic score vectors each of a different keyphrase, and separately analyzing parallel multiple element acoustic score vectors each of a different keyphrase.

By one approach, at least one non-transitory machine readable medium comprises a plurality of instructions that, in response to being executed on a computing device, cause the computing device to perform keyphrase detection by: generating, by a neural network accelerator, a multiple element acoustic score vector for a current time instance based on received audio input, wherein the multiple element acoustic score vector comprises at least one acoustic score for at least one rejection model and acoustic scores for at least one multiple state keyphrase model, and wherein the multiple state keyphrase model corresponds to a predetermined keyphrase; recursively aligning elements of a previous multiple element state score vector for a previous time instance with the elements of the multiple element acoustic score vector, wherein the previous multiple element state score vector comprises at least one previous state score for the single state rejection model and previous state scores for the multiple state keyphrase model; generating, by a neural network accelerator, an intermediate score vector by using scores from both the multiple element acoustic score vector and the previous multiple element state score vector; generating, by a neural network accelerator, a current multiple element state score vector of a current time instance comprising performing a propagating operation with the intermediate score vector; determining, by a neural network accelerator, whether current state scores of the current multiple element state score vector indicate that the received audio input is associated with the predetermined keyphrase; and providing at least one command to perform an action when the received audio input is associated with the predetermined keyphrase.

By another approach, the instructions cause the computing device to operate by wherein the instructions cause the computing device to operate by using at least one booling operation to perform keyphrase start-point detection at the neural network accelerator; wherein forming the first bool vector comprises: comparing adjacent elements of a keyphrase score vector output from a keyphrase detection operation, applying −1, 0, and 1 weights at nodes of a neural network to the results of the comparisons, and applying a non-linear activation function to the weighted combinations to obtain a sequence of 0s and 1s; wherein the instructions cause the computing device to operate by: forming a first bool vector at least partially based on a keyphrase score vector output from a keyphrase detection operation, and forming a second inverse bool vector that is an inverse of the first bool vector; separately updating a previous output vector of frame index numbers with the first and inverse bool vectors to respectively form first and second updated vectors; and combining the first and second updated vectors to form a current output vector of frame index numbers wherein a frame index number at a specific element location on the current output vector indicates a start point of a keyphrase; wherein the updated vectors are formed by performing element-by-element multiplication between elements of one of the bool vectors and elements of the previous output vector; wherein the instructions cause the computing device to modify a buffer size to hold the audio input depending on whether speech or non-speech was detected in the audio input as indicated by the neural network accelerator; wherein the instructions cause the computing device to modify the number of active microphones of a plurality of active microphones depending, at least in part, on noise rejection scores received by the neural network accelerator.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A keyphrase detection device comprising:
memory storing received audio input; and
at least one neural network accelerator communicatively connected to the memory to receive the audio input and to operate by:
generating a multiple element acoustic score vector for a current time instance based on the received audio input, wherein the multiple element acoustic score vector comprises at least one acoustic score for at least one rejection model and acoustic scores for at least one multiple state keyphrase model, and wherein the multiple state keyphrase model corresponds to a predetermined keyphrase,
recursively aligning elements of a previous multiple element state score vector for a previous time instance with the elements of the multiple element acoustic score vector, wherein the previous multiple element state score vector comprises at least one previous state score for the single state rejection model and previous state scores for the multiple state keyphrase model,
generating an intermediate score vector by using scores from both the multiple element acoustic score vector and the previous multiple element state score vector,
generating a current multiple element state score vector of a current time instance comprising performing a propagating operation with the intermediate score vector, and
determining whether the received audio input is associated with the predetermined keyphrase by using scores from the current multiple element state score vector; and
a controller to provide at least one command to perform an action when the received audio input is associated with the predetermined keyphrase.

2. The device of claim 1 comprising a keyphrase detection unit autonomously operated by the network accelerator without using a digital signal processor to perform feature extraction, acoustic scoring, and keyphrase decoding by the neural network accelerator and without the use of a digital signal processor.

3. The device of claim 1 wherein the neural network accelerator generates a final score by using a first state score based on the single state rejection model and a second state score that is one of the state scores based on the keyphrase model and wherein both the first and second state scores are from the current multiple element state score vector;
wherein the generating of a final score comprises operating an affine neural network layer wherein the first and second state scores are inputs to the affine layer;
wherein scores on the current multiple element state score vector in addition to the first and second state scores are input to the affine layer and are provided a weight of zero;
wherein the final score is computed by using a threshold value as an input of the affine layer;
wherein the threshold value has a weight of −1, the first state score has a weight of −1, and the second state score has a weight of 1.

4. The device of claim 1 wherein the neural network accelerator operates as if performing a recurrent neural network layer comprising providing a just generated current multiple element state score vector as a previous multiple element state score vector to be used with a next multiple element acoustic score vector to generate the vector of intermediate state score values.

5. The device of claim 1 wherein the neural network accelerator treats elements of the previous multiple element state score vector as bias values to be applied to elements of the multiple element acoustic score vector.

6. The device of claim 1 wherein the propagating operation is a determination of a maximum value among values of individual adjacent pairs of states along the intermediate score vector to form the current multiple element state score vector.

7. The device of claim 1 wherein the neural network accelerator generates the at least one acoustic score for at least one rejection model by separately pooling multiple acoustic base scores of multiple rejection categories of silence, phonetics, speech noise and non-speech noise to form a single category score of each category before pooling the single category scores together to form a single acoustic rejection score.

8. A computer-implemented system for performing keyphrase detection comprising:
at least one microphone to capture audio input;
memory to store the audio input;
at least one processor communicatively coupled to the at least one microphone and at least one memory, and comprising at least one neural network accelerator to receive the audio input and operate by:
generating a multiple element acoustic score vector for a current time instance based on received audio input, wherein the multiple element acoustic score vector comprises at least one acoustic score for at least one rejection model and acoustic scores for at least one multiple state keyphrase model, and wherein the multiple state keyphrase model corresponds to a predetermined keyphrase;
recursively aligning elements of a previous multiple element state score vector for a previous time instance with the elements of the multiple element acoustic score vector, wherein the previous multiple element state score vector comprises at least one previous state score for the single state rejection model and previous state scores for the multiple state keyphrase model;
generating an intermediate score vector by using scores from both the multiple element acoustic score vector and the previous multiple element state score vector,
generating a current multiple element state score vector of a current time instance comprising performing a propagating operation with the intermediate score vector, and
determining whether current state scores of the current multiple element state score vector indicate that the received audio input is associated with the predetermined keyphrase; and
providing at least one command to perform an action when the received audio input is associated with the predetermined keyphrase.

9. The system of claim 8, wherein the neural network accelerator generates both a speech final score and a non-speech final score comprising pooling at least some of the same base acoustic rejection scores used to generate the at least one acoustic score for the at least one rejection model; and
using the speech and non-speech final scores to determine whether speech or non-speech exists in the audio input.

10. The system of claim 8 wherein the neural network accelerator is to operate by forming a multiple element vector of pooled rejection acoustic scores by using the base acoustic scores; and performing operations on the multiple element vector of pooled rejection acoustic scores to form a speech final score and a non-speech final score.

11. The system of claim 10 wherein at least one speech-related score of the multiple element vector of pooled rejection acoustic scores is based on the pooling of speech-related base rejection scores and at least one non-speech-related score of the multiple element vector of pooled rejection acoustic scores is based on the pooling of non-speech-related base rejection scores.

12. The system of claim 11, wherein the base rejection scores of phonetics and speech-related noise rejection categories are pooled together to form the speech-related scores, and silence and non-speech noise categories are pooled together to form the non-speech-related scores.

13. The system of claim 10, wherein the pooled rejection acoustic scores to be used as elements in the multiple element vector of pooled rejection acoustic scores are pooled together to form the at least one acoustic score of the at least one rejection model on the multiple element acoustic score vector to detect a keyphrase.

14. The system of claim 13 wherein the first and last score of the multiple element vector of pooled rejection acoustic scores are based on the pooling of both the same of speech or non-speech-related base rejection scores and the acoustic rejection scores between the first and last scores are pooled rejection acoustic scores based on the other of the speech or non-speech-related base rejection scores.

15. The system of claim 14 wherein the first and second scores of the current multiple element rejection state score vector is used to form one of the speech or non-speech final score, and the last and second to last scores of the current multiple element rejection state score vector are used to form the other of the speech or non-speech final score.

16. The system of claim 14 wherein scores of the current multiple element rejection state score vector are input to an affine neural network layer operation to form the speech and non-speech final scores; and wherein the weights of −1 are provided to one of the non-speech and speech scores of the current multiple element rejection state score vector and a weight of 1 to the other of the speech or non-speech scores of the current multiple element rejection state score vector.

17. The system of claim 9 wherein the operations are the same operations as performed on the multiple element acoustic score vector to form a current multiple element rejection state score vector to be used to form the speech and non-speech final scores.

18. The system of claim 9 wherein the neural network accelerator operates by at least one of: concatenating a plurality of multiple element acoustic score vectors each of a different keyphrase, and separately analyzing parallel multiple element acoustic score vectors each of a different keyphrase.

19. At least one non-transitory machine readable medium comprising a plurality of instructions that, in response to being executed on a computing device, cause the computing device to perform keyphrase detection by:
generating, by a neural network accelerator, a multiple element acoustic score vector for a current time instance based on received audio input, wherein the multiple element acoustic score vector comprises at least one acoustic score for at least one rejection model and acoustic scores for at least one multiple state keyphrase model, and wherein the multiple state keyphrase model corresponds to a predetermined keyphrase;
recursively aligning elements of a previous multiple element state score vector for a previous time instance with the elements of the multiple element acoustic score vector, wherein the previous multiple element state score vector comprises at least one previous state score for the single state rejection model and previous state scores for the multiple state keyphrase model;

generating, by a neural network accelerator, an intermediate score vector by using scores from both the multiple element acoustic score vector and the previous multiple element state score vector;

generating, by a neural network accelerator, a current multiple element state score vector of a current time instance comprising performing a propagating operation with the intermediate score vector;

determining, by a neural network accelerator, whether current state scores of the current multiple element state score vector indicate that the received audio input is associated with the predetermined keyphrase; and providing at least one command to perform an action when the received audio input is associated with the predetermined keyphrase.

20. The machine readable medium of claim 19, wherein the instructions cause the computing device to operate by using at least one booling operation to perform keyphrase start-point detection at the neural network accelerator.

21. The machine readable medium of claim 20, wherein forming the first bool vector comprises:

comparing adjacent elements of a keyphrase score vector output from a keyphrase detection operation, applying −1, 0, and 1 weights at nodes of a neural network to the results of the comparisons, and applying a non-linear activation function to the weighted combinations to obtain a sequence of 0s and 1s.

22. The machine readable medium of claim 20 wherein the instructions cause the computing device to operate by:

forming a first bool vector at least partially based on a keyphrase score vector output from a keyphrase detection operation, and forming a second inverse bool vector that is an inverse of the first bool vector;

separately updating a previous output vector of frame index numbers with the first and inverse bool vectors to respectively form first and second updated vectors; and combining the first and second updated vectors to form a current output vector of frame index numbers wherein a frame index number at a specific element location on the current output vector indicates a start point of a keyphrase.

23. The machine readable medium of claim 22 wherein the updated vectors are formed by performing element-by-element multiplication between elements of one of the bool vectors and elements of the previous output vector.

24. The machine readable medium of claim 19, wherein the instructions cause the computing device to modify a buffer size to hold the audio input depending on whether speech or non-speech was detected in the audio input as indicated by the neural network accelerator.

25. The machine readable medium of claim 19, wherein the instructions cause the computing device to modify the number of active microphones of a plurality of active microphones depending, at least in part, on noise rejection scores received by the neural network accelerator.

* * * * *